July 7, 1953
M. H. NIELSEN
2,644,178
MEANS FOR AND METHODS OF PRODUCING
PREASSEMBLED NUTS AND WASHERS
Filed Oct. 19, 1949
14 Sheets-Sheet 1
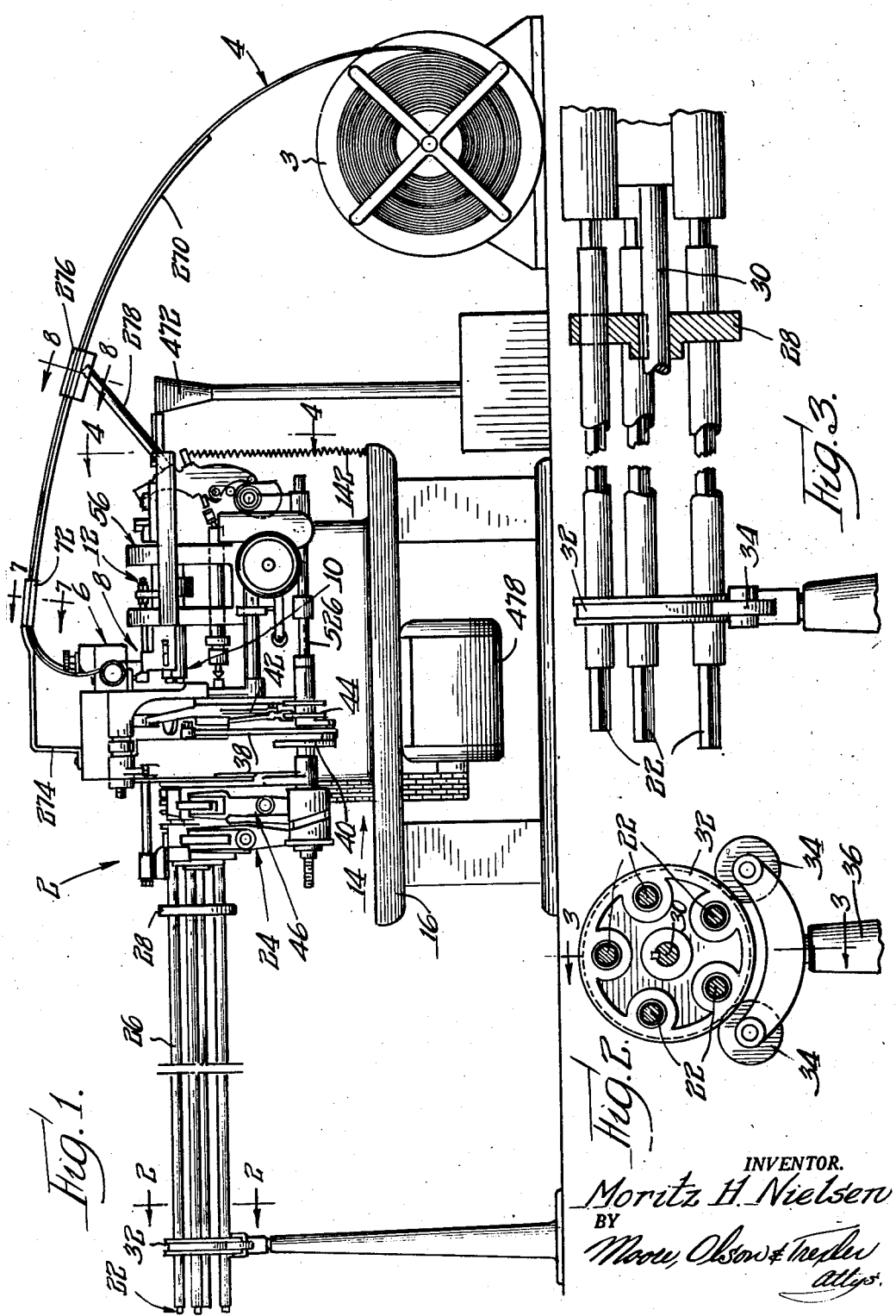
INVENTOR.
Moritz H. Nielsen
BY
Moore, Olson & Trexler
Attys.

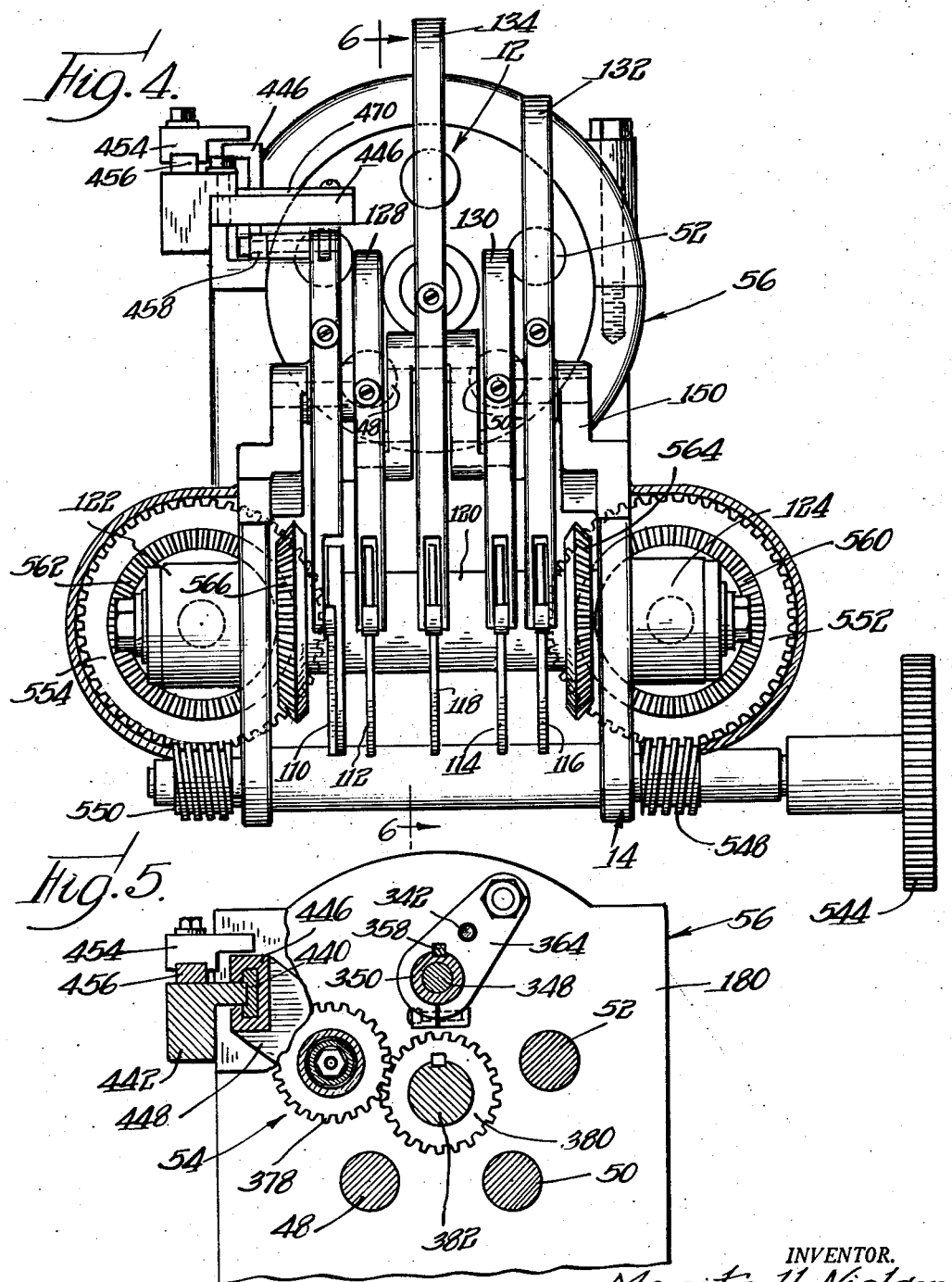

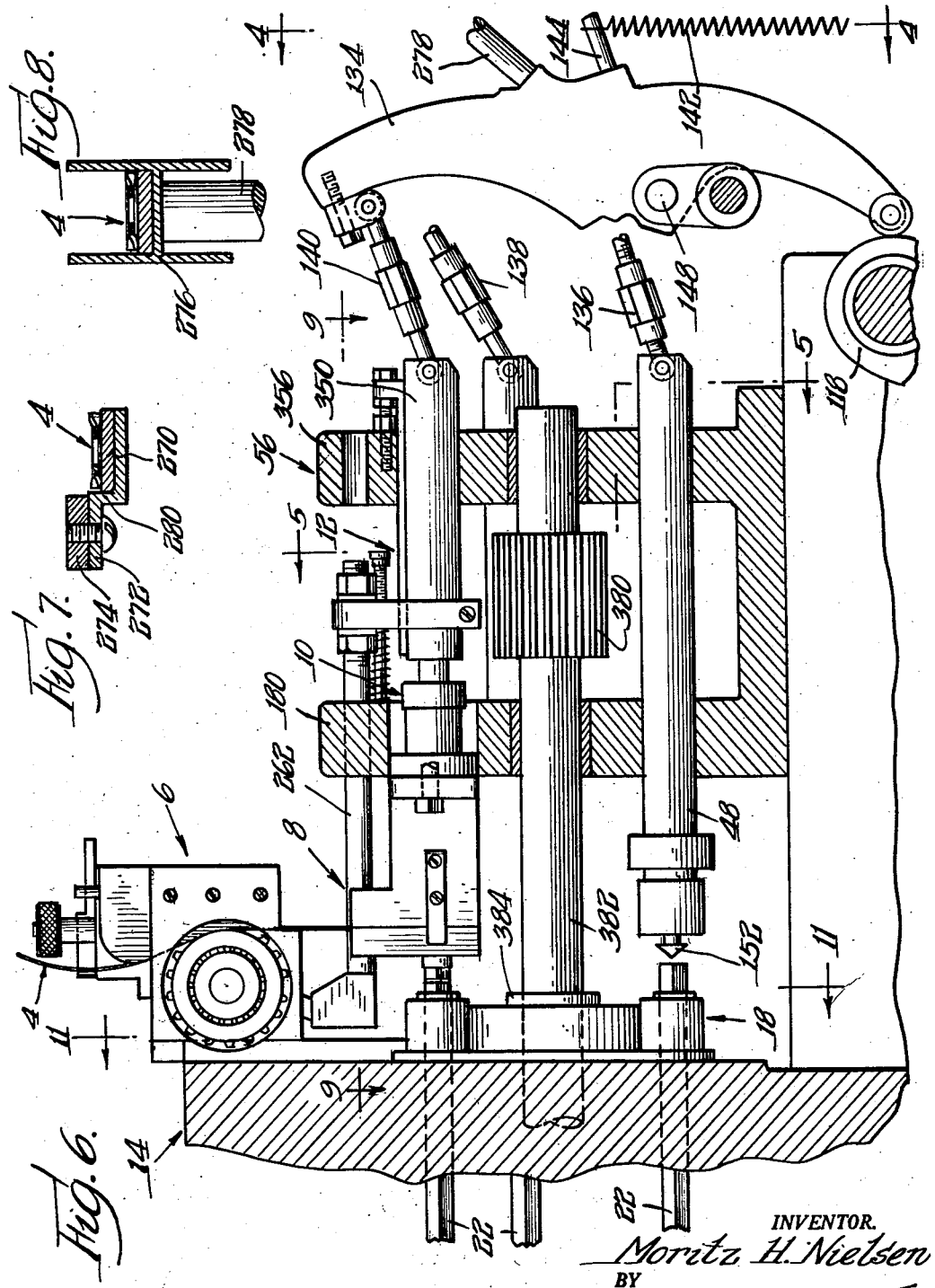

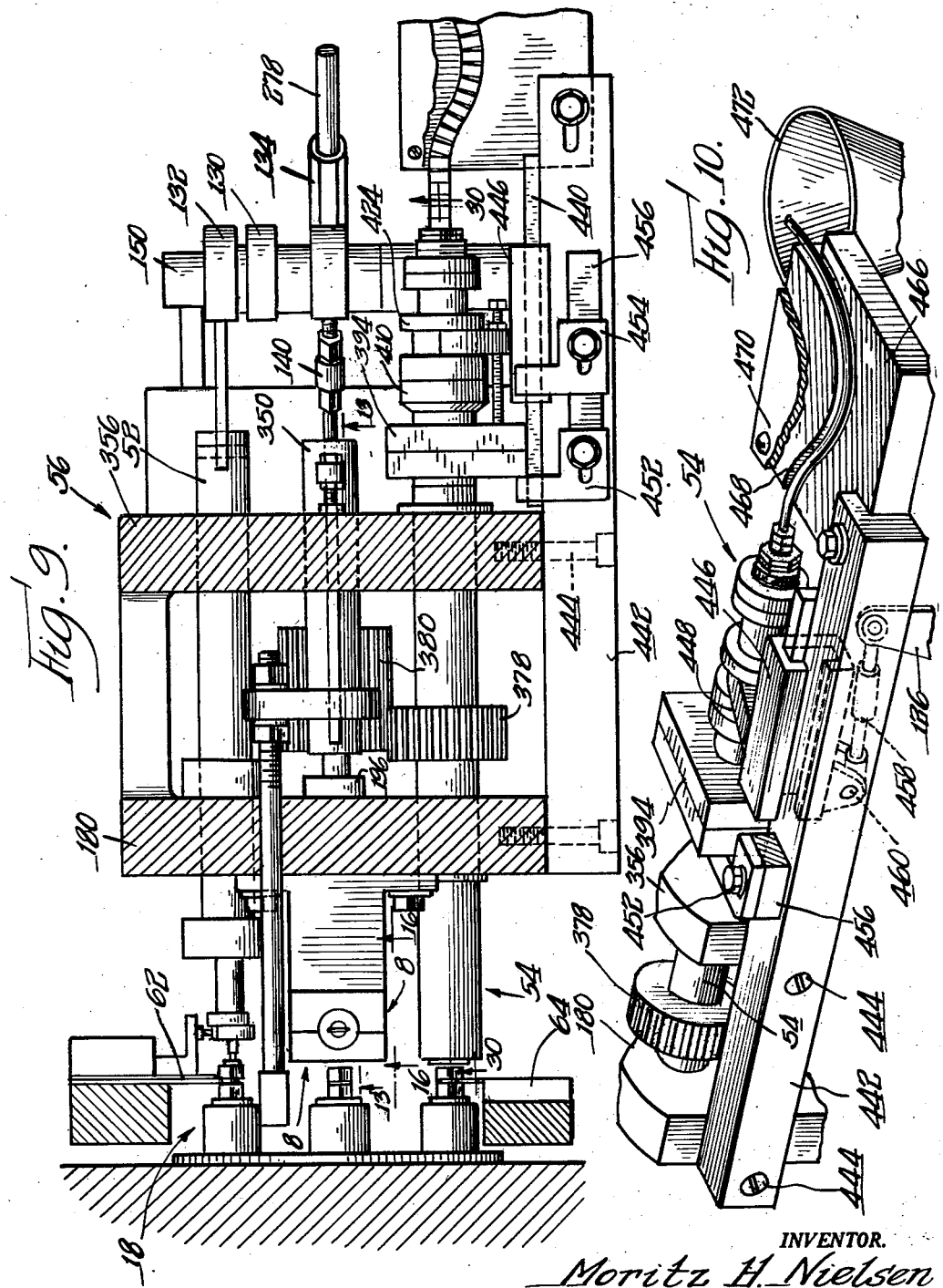

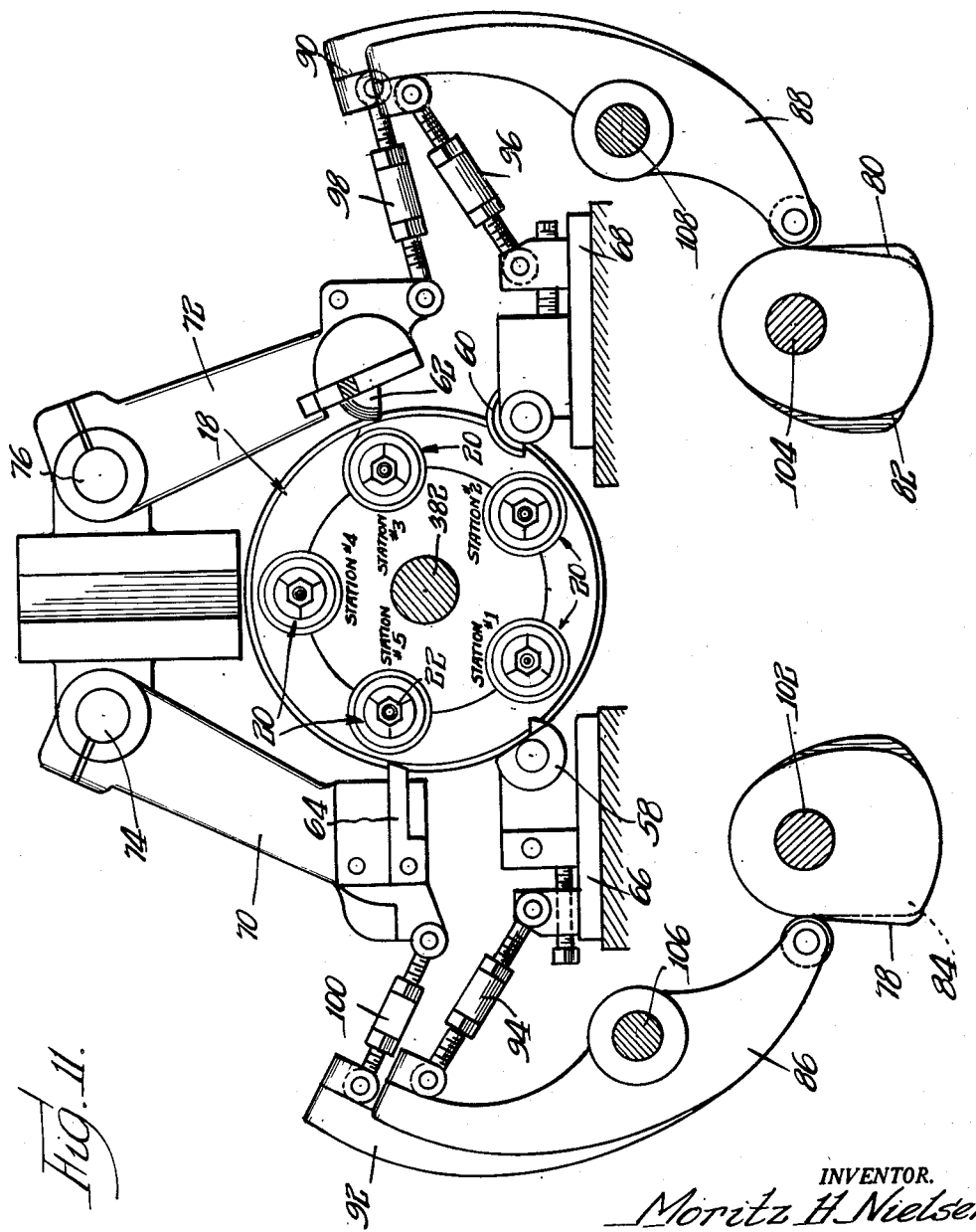

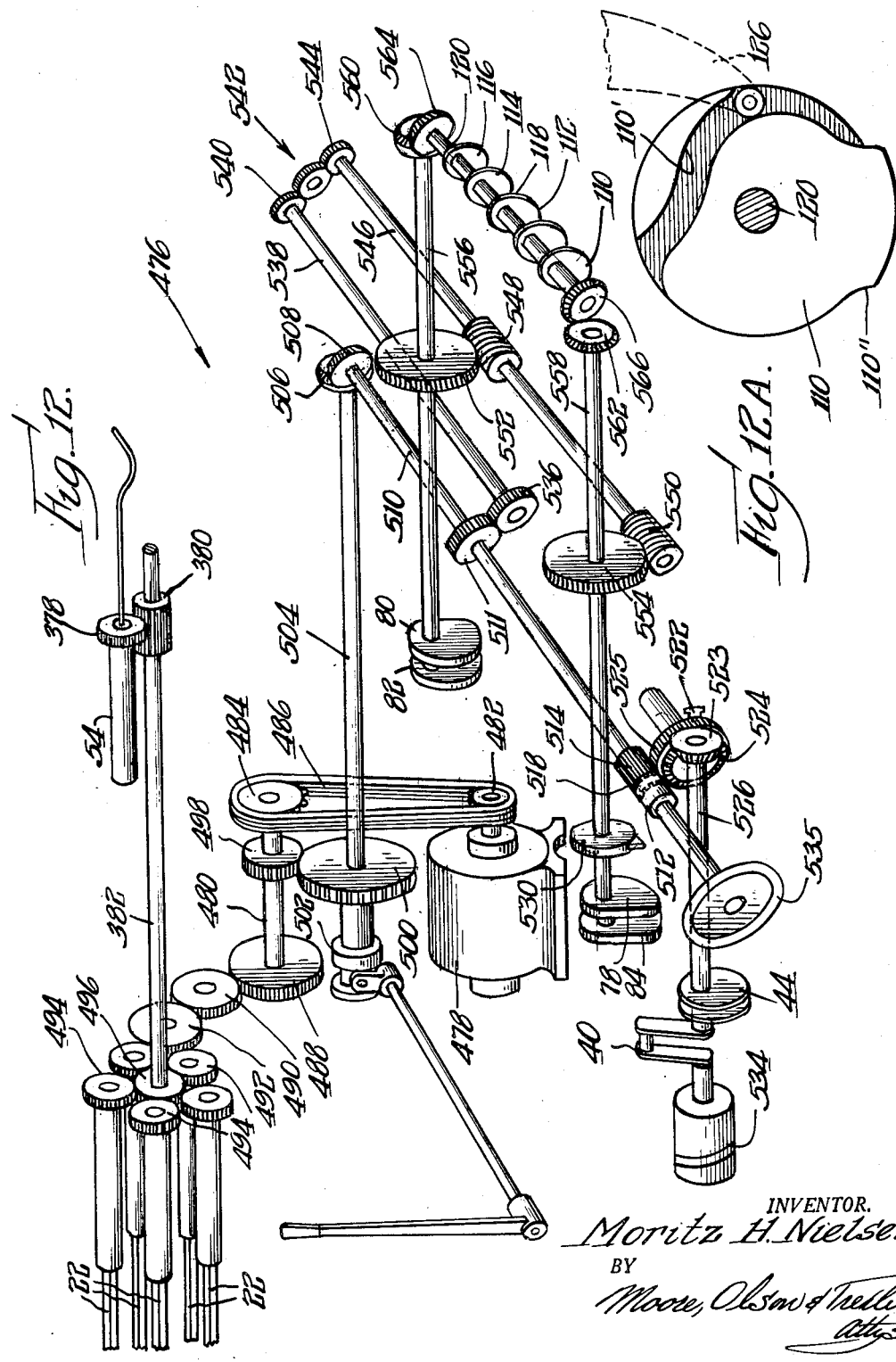

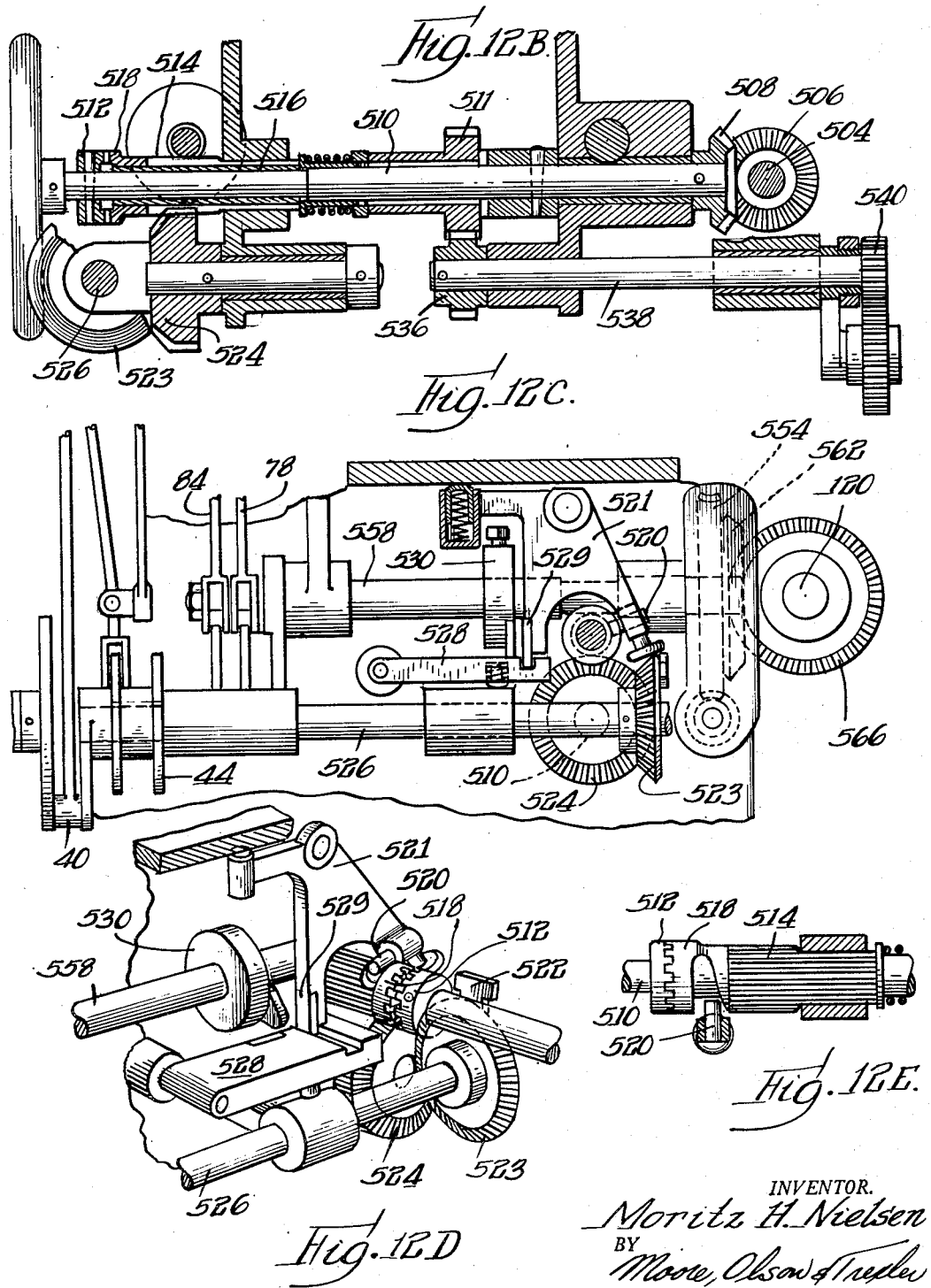

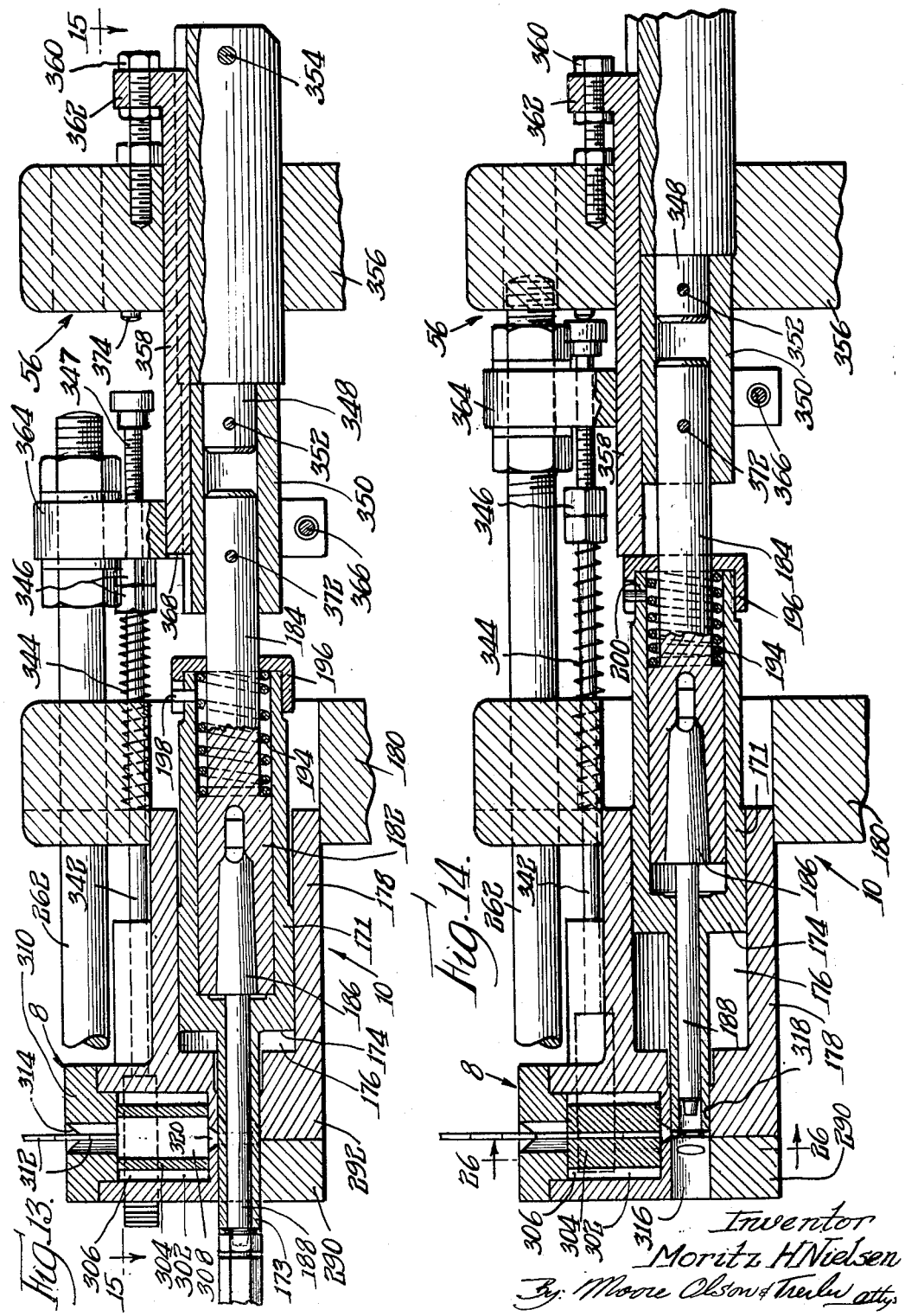

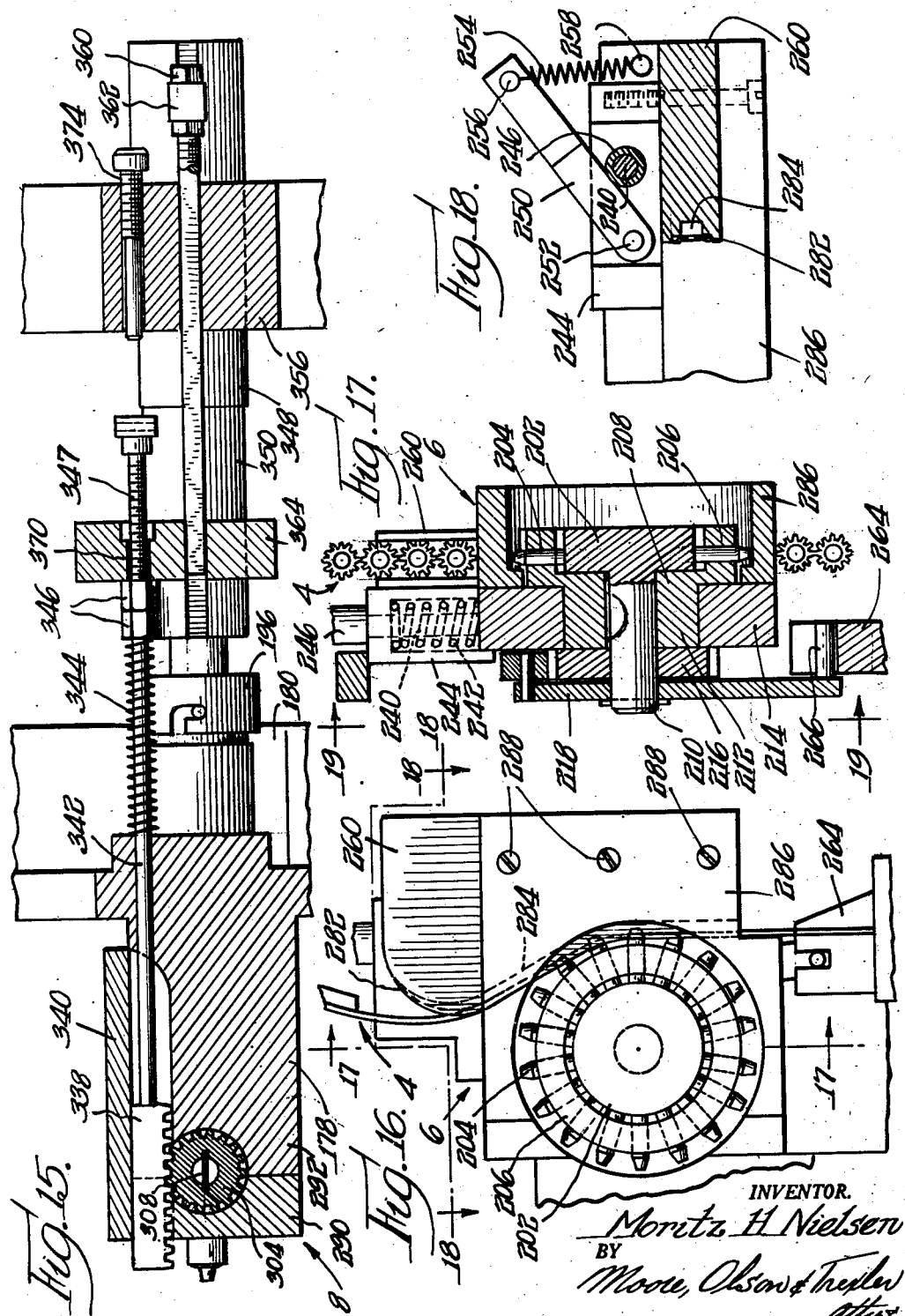

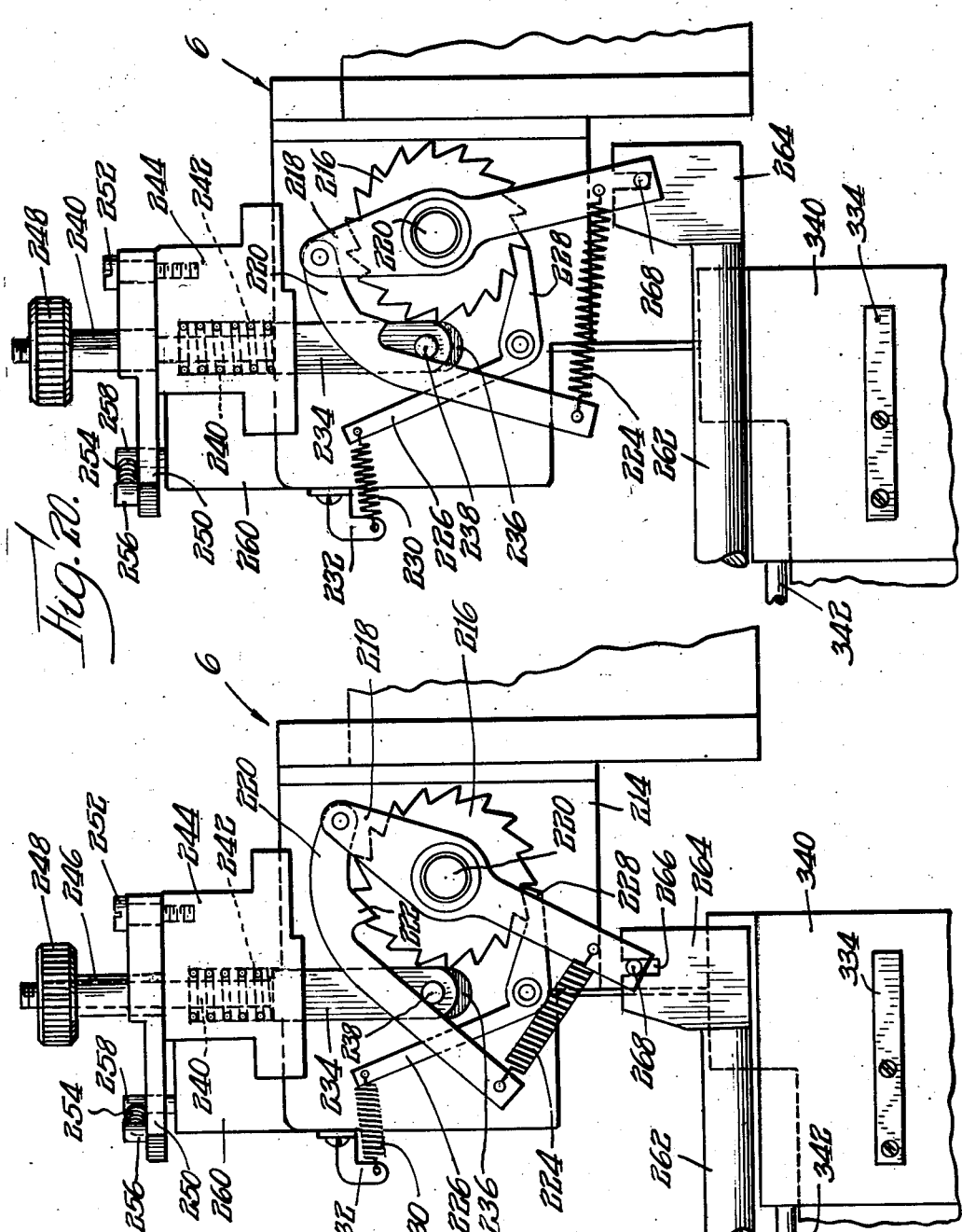

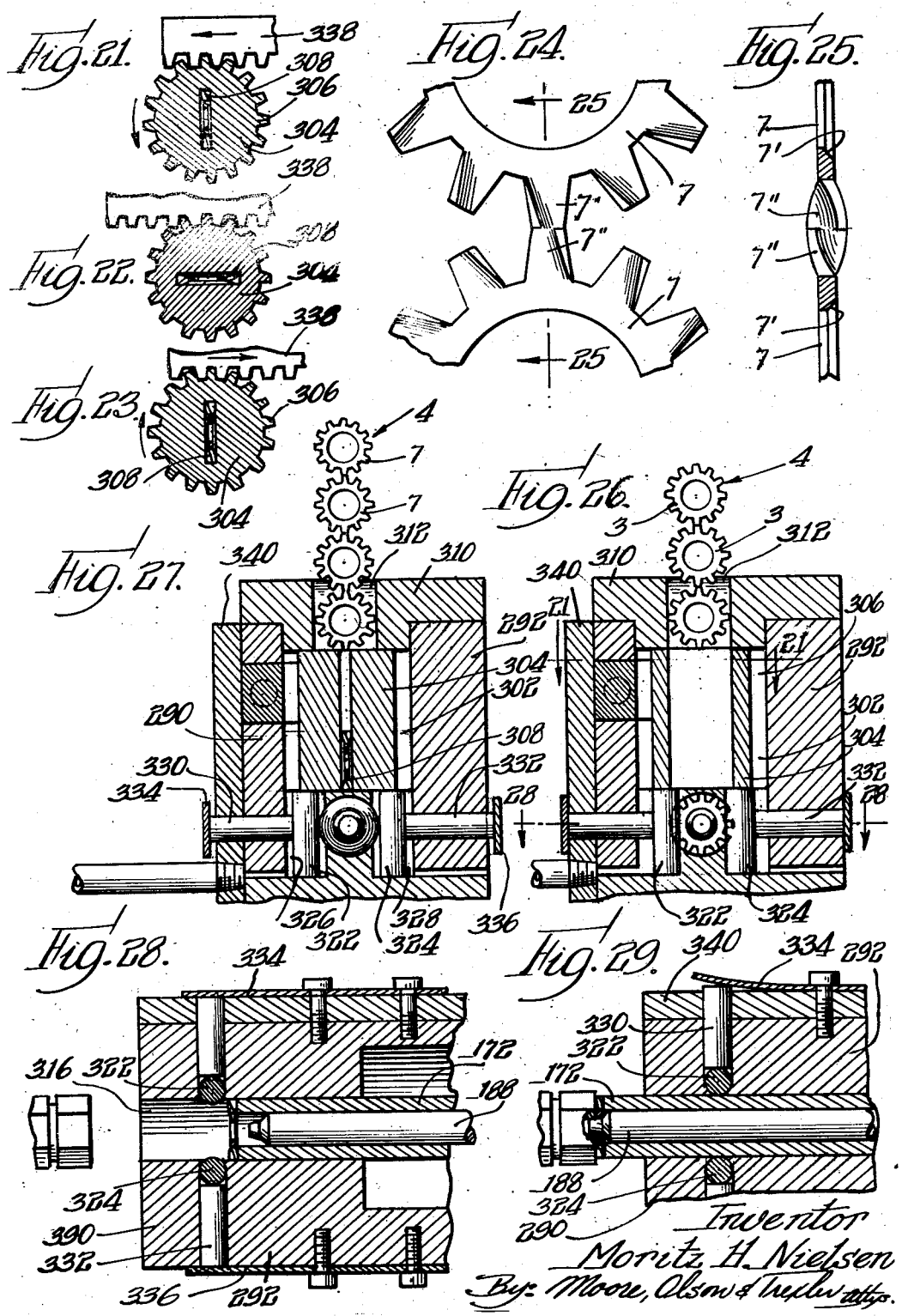

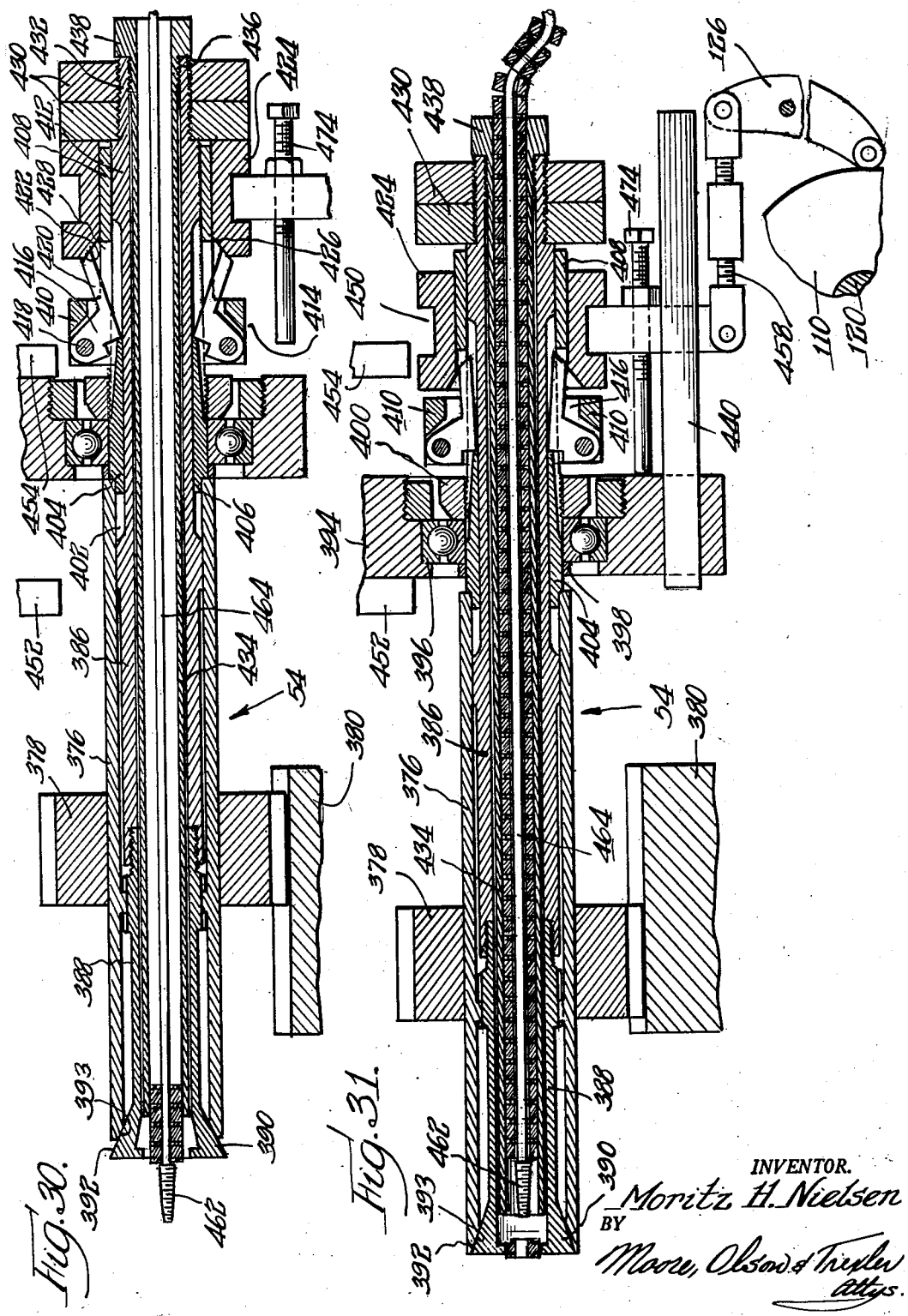

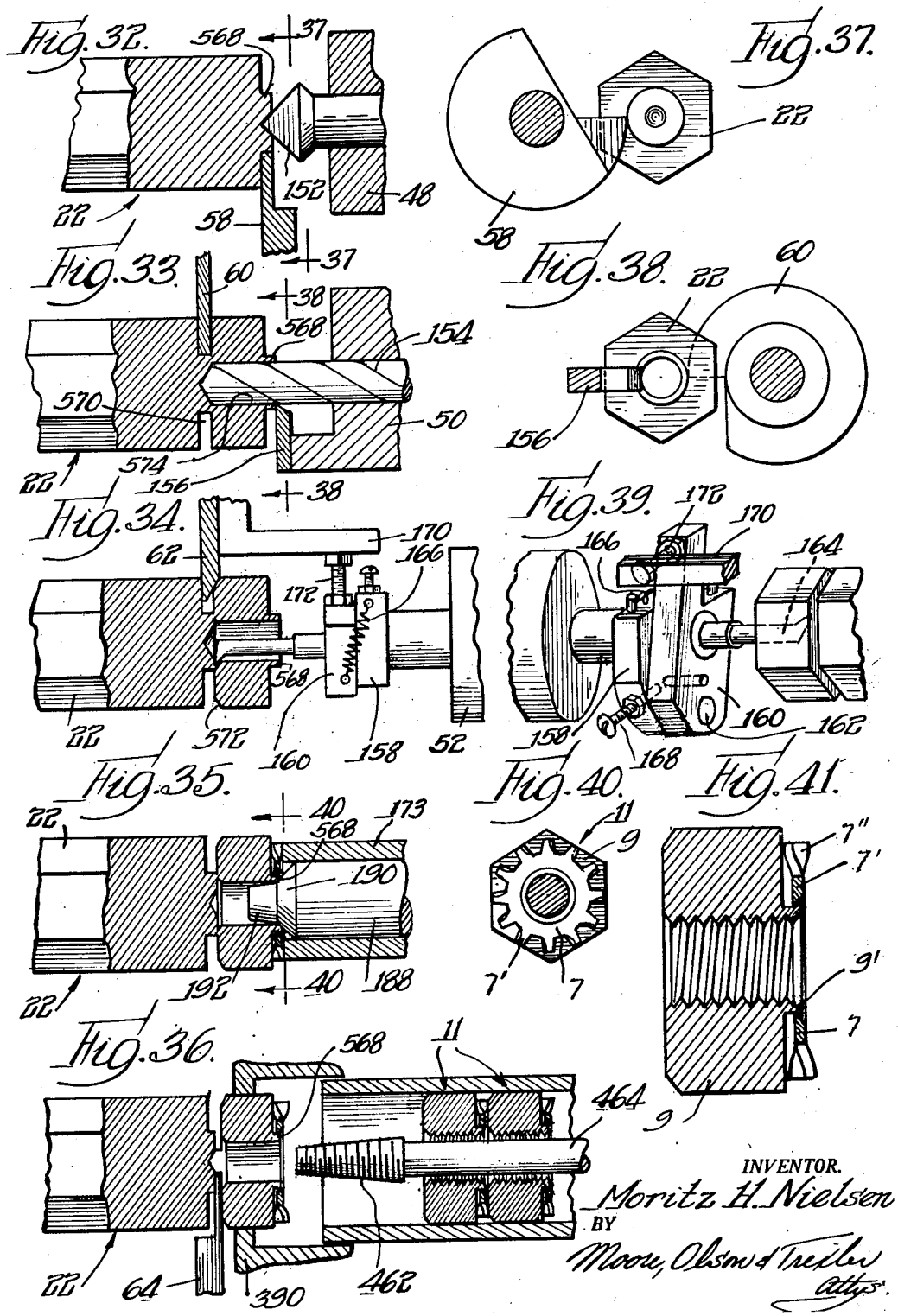

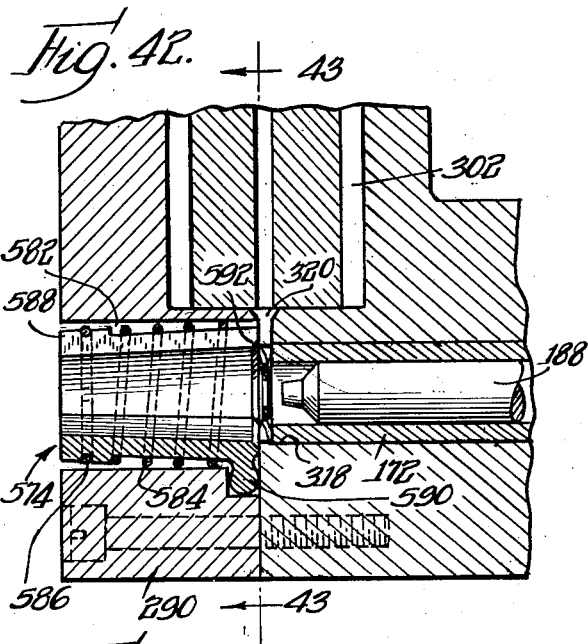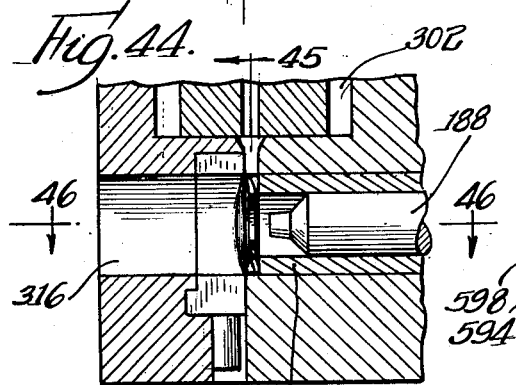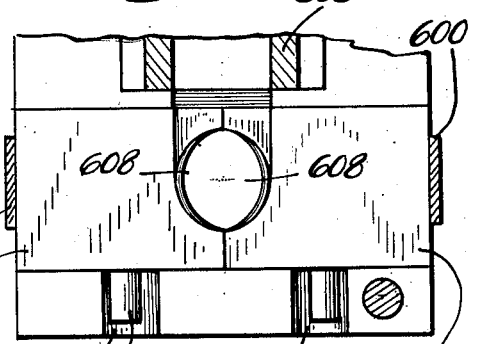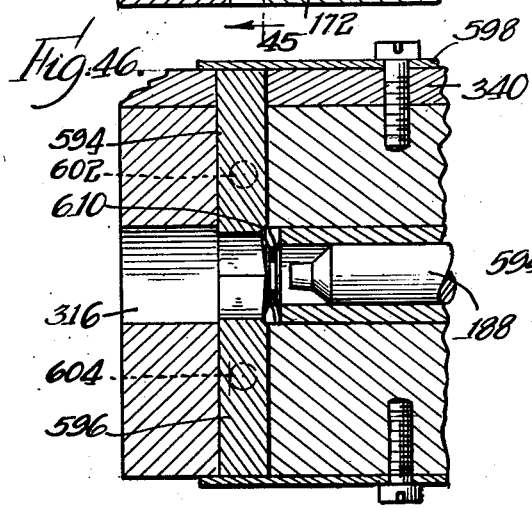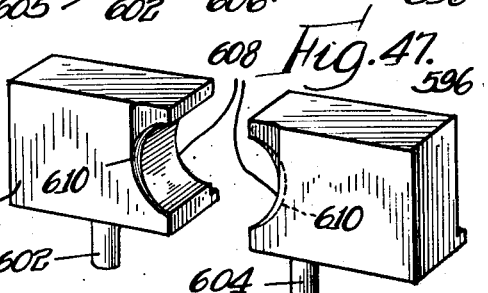

Patented July 7, 1953

2,644,178

UNITED STATES PATENT OFFICE 2,644,178

MEANS FOR AND METHODS OF PRODUCING PREASSEMBLED NUTS AND WASHERS

Moritz H. Nielsen, Chicago, Ill., assignor to Illinois Tool Works, Chicago, Ill., a corporation of Illinois Application October 19, 1949, Serial No. 122,178

29 Claims. (Cl. 10—155)

This invention relates to a method and machine for manufacturing assembled nut and washer units.

The present invention consists in a machine and method by which multiple operations are performed upon suitable rod or bar stock to form nut blanks having washer receiving sections to telescope assembled washers, specifically, toothed lock washers, with the washer receiving sections of the partially formed nuts or nut blanks, and thereafter to thread the nut blanks.

It is an object of this invention to provide a method and a machine for manufacturing assembled nut and washer units.

It is a further object of the invention to provide a method and machine for assembling washers with nut blanks during the process of manufacture of the nuts.

It has heretofore been proposed to provide assembled nut and washer units by forcing radially resilient split ring washers over the preformed skirts of completed nuts, but these have not been entirely satisfactory. The skirts of the nuts interfere with the proper locking action of the split ring washers; each split ring washer is frictionally held against rotation relative to the skirt of the nut, and tends to mar or fracture the work piece, and there is an unsatisfactorily high percentage of loss of washers from the units because of the impositive nature of their securement against axial movement with respect to the nuts. It is, accordingly, an important object of this invention to provide a method and means for assembling continuous ring, preferably toothed, lock washers with nuts or nut blanks in such manner that the washers may be rotated freely relative to the nuts, and yet be held positively against dislodgement therefrom.

An ancillary object of the invention is to provide attachments for a nut making machine, by means of which said machine is converted into a machine for making nut and washer assembly units.

Other and further objects of the invention are to provide means for assembling washers with drilled but unthreaded nut blanks; to provide means for feeding a strip of washers to washer severing and assembling mechanisms by means of which the washers are assembled with nut blanks in the process of manufacturing nuts; to provide an assembly mechanism which not only telescopes a nut or nut blank with the washer, but at the same time causes interlocking of the washer with the nut so that permanently assembled units of nuts and washers are provided by this assembly mechanism; to provide an attachment or attachments for a standard or well known automatic screw machine, whereby said machine can be readily converted into a machine for manufacturing assembled nut and washer units; and to provide a machine for automatically feeding partially formed skirted nut blanks to an assembly mechanism while said blanks are still attached to the nut stock, the assembly mechanism telescoping washers with the skirts of the nut blanks and upsetting, swaging or enlarging the skirts of the nut blanks beneath the washers, or in the plane of the washers, permanently to hold the nuts and washers in assembled relation, and thereafter automatically threading or tapping the nut blanks and severing the same from the stock.

Other and further objects and advantages of the invention will be apparent when taken in connection with the drawings, wherein:

Fig. 1 is a front view in vertical elevation of a machine embodying the invention;

Fig. 2 is a fragmentary view taken in section along the line 2—2 of Fig. 1;

Fig. 3 is a fragmentary view in vertical section, taken along the line 3—3 of Fig. 2;

Fig. 4 is a fragmentary view in elevation and partly in section, taken substantially along the line 4—4 of Fig. 1;

Fig. 5 is a fragmentary view in vertical section, taken substantially along the line 5—5 of Fig. 6;

Fig. 6 is a fragmentary view in vertical section, taken substantially along the line 6—6 of Fig. 4;

Fig. 7 is a view in vertical section, taken substantially along the line 7—7 of Fig. 1;

Fig. 8 is a view in section, taken substantially along the line 8—8 of Fig. 1;

Fig. 9 is a fragmentary view in horizontal section, taken substantially along the line 9—9 of Fig. 6;

Fig. 10 is a fragmentary view in perspective of the nut tapping device;

Fig. 11 is a fragmentary view in vertical section, taken along the line 11—11 of Fig. 6;

Figs. 12, 12A, 12B, 12C, 12D, and 12E are diagrammatic views illustrating the driving mechanism of the machine;

Fig. 13 is a fragmentary view in vertical section, taken along the line 13—13 of Fig. 9;

Fig. 14 is a view similar to Fig. 13, but with the parts in a different position of operation;

Fig. 15 is a fragmentary view in horizontal section, taken substantially along the line 15—15 of Fig. 13;

Fig. 16 is a fragmentary view in elevation, taken substantially along the line 16—16 in Fig. 9;

Fig. 17 is a fragmentary view in vertical section, taken along the line 17—17 of Fig. 16;

Fig. 18 is a fragmentary view in horizontal section, taken substantially along the line 18—18 of Fig. 16;

Fig. 19 is a fragmentary view in elevation, looking along the line 19—19 of Fig. 17;

Fig. 20 is a view similar to Fig. 19, but with the parts in a different position of operation;

Fig. 21 is a view in horizontal section, taken along the line 21—21 of Fig. 26;

Figs. 22 and 23 are views similar to Fig. 21, but with the parts in different positions of operation;

Fig. 24 is a fragmentary enlarged view showing the connection between washers of the washer strip;

Fig. 25 is a fragmentary view in section, taken substantially along the line 25—25 of Fig. 24;

Fig. 26 is a fragmentary view in vertical section, taken along the line 26—26 of Fig. 14;

Fig. 27 is a view similar to Fig. 26, but with the parts in a different position of operation;

Fig. 28 is a fragmentary view in horizontal section, taken substantially along the line 28—28 of Fig. 26;

Fig. 29 is a fragmentary view of a portion of Fig. 28, but with the parts in a different position of operation;

Fig. 30 is a fragmentary view in vertical section, taken substantially along the line 30—30 of Fig. 9;

Fig. 31 is a view similar to Fig. 30, with the parts in a different position of operation;

Figs. 32 to 36, inclusive, are sectional views, illustrating the sequence of operations upon the nut stock and the assembling of the washers with the partially formed nuts;

Fig. 37 is a fragmentary view in vertical section, taken substantially along the line 37—37 of Fig. 32;

Fig. 38 is a fragmentary view in vertical section, taken substantially along the line 38—38 of Fig. 33;

Fig. 39 is a fragmentary view in perspective of the mechanism shown in Fig. 34;

Fig. 40 is a fragmentary view in vertical section, taken substantially along the line 40—40 of Fig. 35;

Fig. 41 is an enlarged sectional view, showing a washer assembled with a nut blank;

Fig. 42 is a fragmentary view in vertical section of a modified form of washer feed control mechanism;

Fig. 43 is a view in vertical section, taken along the line 43—43 of Fig. 42;

Fig. 44 is a view similar to Fig. 42, showing another modified form of washer feed control mechanism;

Fig. 45 is a view in vertical section, taken along the line 45—45 of Fig. 44;

Fig. 46 is a view in horizontal section, taken along the line 46—46 of Fig. 44; and Fig. 47 is a view in perspective of washer control slides of the mechanism of Figs. 44 to 46.

As shown in the drawings, a machine which forms one embodiment of the present invention comprises an automatic screw machine 2, of standard type, such as a "Davenport 5 Spindle Automatic Screw Machine," manufactured by the Davenport Machine Tool Company, Inc., of Rochester, New York, for which are provided a plurality of additional mechanisms or attachments, by which said machine may be adapted for the production of a permanently assembled nut and washer unit as a new article of commerce. These additional mechanisms or attachments comprise a reel 3 for receiving a rolled or wound strip 4 of washers; a washer feed mechanism 6; washer severing mechanism 8; an assembly mechanism 10; and drive means 12 for the washer feed mechanism 6, washer severing mechanism 8 and assembly mechanism 10. The washer severing means 8, the assembling mechanism 10 and the drive means 12 are constructed to replace one of the spindles of the five-tool spindles of the automatic screw machine. Special tools are provided for, and to cooperate with, the other four spindles of the automatic screw machine to perform a selective sequence of operations upon bar or rod stock to provide at one end of each stock bar or rod a partially formed nut or nut blank fashioned to receive a washer 7, specifically, a continuous ring, toothed lock washer, at the assembly station. At the assembly station the assembly mechanism telescopes a washer with a partially formed nut blank, and enlarged, swages, or extrudes material of the nut, permanently to hold the washer on the partially formed nut blank. The permanently assembled nut blank and washer pass from the assembly mechanism to another of the work spindle stations at which special tools, on or cooperating with the spindle, severs the partially formed nut blank from the stock bar or rod, threads or taps the nut blank to form the complete nut 9, and feeds or conveys the completed nut and washer units 11 (Fig. 36) from the machine.

The automatic screw machine 2 comprises a frame 14, mounted upon a suitable platform or stand 16, a revolving head 18, Fig. 11, having five rotatable stock clamping and releasing chucks 20, to which stock rods or bars 22, preferably hexagonal in cross-section, Figs. 1 and 4, are supplied by a standard bar feed mechanism (not shown) operated by a stock feed lever 24. The stock rods or bars 22 are supported at one end by the stock chucks 20, carried by the revolving head 18, Fig. 4, and pass through supporting or guiding tubes or pipes 26. The tubes or pipes 26 are mounted at one end in a disk 28, keyed to an intermittently rotated shaft 30, Fig. 3. The tubes or pipes 26 are also supported, adjacent their opposite end, by a disk or wheel 32, keyed to the shaft 30 and journaled on spaced rollers 34 at the upper end of a pedestal 36.

The head 18 is revolved intermittently by the usual grab mechanism (not shown) carried by a lever 38, operated by crank 40, the head being indexed and locked in indexed position by the indexing lever 42, operated by the indexing cam 44. The opening of the stock chucks 20, in timed relation to the advancement of the bar feed mechanism, is controlled by the usual chuck operating mechanism (not shown) operated by the chuck control lever 46.

As shown in Fig. 11, the intermittently revolvable head 18 carries the stock in succession from an initial work station 1, through work stations 2, 3, 4 and 5. At stations 1, 2, 3 and 5 nut forming operations are performed upon the stock bars or rods 22 by special tools carried by rectilinearly reciprocable spindles 48, 50 and 52 and the nut tapping mechanism 54 of the 5-spindle automatic screw machine (see Figs 5 and 6). The spindles and nut tapping mechanism are carried by the usual stationary, U-shape, frame member or support 56, supported on the machine frame 14 in such manner that the spindles and nut tapping mechanism are aligned with the stock chucks 20 at stations 1, 2, 3 and 5. The fifth spindle of the automatic screw machine is replaced on the frame 56 by the assembly mechanism 10 and the drive means 12, hereinafter to be described.

At stations 1, 2, 3 and 5 the stock rods or bars are also operated upon by transversely shiftable side cutting tools 58, 60, 62 and 64, Fig. 11, the side cutting tools 58 and 60 being mounted upon slide blocks 66 and 68, supported on the frame 14 and the side cutting tools 62 and 64 being mounted on levers 70 and 72 pivoted at their upper ends on rods 74 and 76 carried by appropriate supporting means mounted on the frame 14. The side cutting tools 58 to 64, inclusive, are actuated in timed relation to the revolution of the head 18 by suitable cams 78, 80, 82 and 84, through bell cranks 86, 88, 90 and 92 and adjustable links 94, 96, 98 and 100. The cams 78 and 84 are mounted on front and rear cam shafts 102, 104, journaled in suitable brackets (not shown), supported by the machine frame 14. Bell crank levers 86 to 92 are pivoted on front and rear rods 106 and 108 carried by suitable brackets (not shown) secured to the frame 14.

The side cutting tools are moved inwardly or toward the stock bars or rods by the cams 78 to 84, inclusive, and are retracted by spring means (not shown) which serve also to maintain the cam follower rollers, carried by the bell cranks 86 to 92, in engagement with the actuating cams 78 to 84.

The tool spindles 48 to 54 and the drive means 12 are advanced or moved toward the stock bars or rods by cams 110, 112, 114, 116 and 118, respectively, Fig. 4. These cams are mounted upon a common transverse shaft 120, journaled in side bearings 122 and 124 mounted upon the frame 14. The cams 110 to 118, inclusive, operate the tool spindles 48 to 54 and the drive means 12 through bell cranks 126, 128, 130, 132 and 134, respectively, Figs. 4 and 6, and adjustable links, such as 136, 138 and 140, Fig. 6. The tool spindles are retracted by springs such as the spring 142, Fig. 6, secured at one end to a pin 144, carried by each bell crank, and at the other end to the frame of the machine, as illustrated in Fig. 1. The bell cranks 110 to 118 are pivoted on pins, such as the pin 148, Fig. 6, carried by a bracket or brackets 150, Fig. 4, secured to the machine frame 14.

The tool spindle 48, which is aligned with the stock at the initial or stock feed-in station 1, carries a countersinking tool or center punch 152, Figs. 6 and 32.

Spindle 50 aligned with each stock rod or bar at station 2 carries a drill 154 (Fig. 33) and an end surfacing, skirt dressing, cutting tool 156.

Spindle 52, aligned with each stock bar or rod at station 3, has pinned to it a depending bracket 158, Figs. 34 and 39. A tool-carrying bar or lever 160 is pivoted at its lower end to bracket 158 (Fig. 34) as by a pin 162 (Fig. 39). The bar 160 carries a chamfering or boring tool 164 which projects outwardly therefrom toward the stock rod or bar 22. The bar 160 is urged in one direction by a spring 166 fastened at one end to the bracket 158 and bearing upon the tool-receiving bar 160 so as to urge the bar in a counterclockwise direction, as seen in Fig. 39, against stop means 168, in which position the chamfering or boring tool 164 is aligned with the axis of the spindle 52 and the axis of the stock rod or bar 22.

The tool-receiving bar 160 is moved in the opposite direction by means of an actuating bar 170 carried by the mounting lever 72 for the side cutting tool 62, the bar 170 engaging a set screw 172 carried by the bar 160. When the bar 170 moving inwardly engages the set screw 172, the boring or chamfering tool 164 is moved in a counterclockwise direction, as seen in Fig. 39, to position the tool 164 in an offset relation with respect to the common axis of the spindle and stock so that the tool cuts or forms an internal chamfer on the nut blank.

At station 4 the usual spindle is replaced by the assembly mechanism 10 and the drive means 12, which will now be described.

*Assembly mechanism*

The assembly mechanism 10 (Figs. 1, 6, 9, and 13 to 15) comprises a cylinder or sleeve 171 having a reduced forwardly projecting tubular portion or hollow plunger 173. The reduced portion 172 provides the sleeve with an annular shoulder 174. The cylinder or sleeve 171 is slidably mounted in the bore 176 of a housing or mounting block 178 fastened in any suitable manner to, and projecting forwardly from, the forward upstanding arm 180 of the U-shaped spindle mounting frame 56. A plunger 182 having a reduced rear end portion 184 is slidably mounted in the sleeve or cylinder 170 and is provided with a tapered bore at its forward end to receive the tapered end 186 of a nut swaging, extruding or enlarging tool or plunger 188. The tool 188 projects from the plunger 182, by which it is carried, through the hollow plunger or reduced portion 172 of the cylinder or sleeve 171. The tool or plunger 188 is formed at its forward end, as best shown in Fig. 35, with a short, sharply tapered or beveled, nut swaging, extruding or enlarging portion 190 of relatively short axial extent and a substantially longer, slightly tapered centering prong or portion 192.

The cylinder 171 and plunger 182 are urged relatively in opposite directions by a coil spring 194 (Figs. 13 and 14) interposed between the shoulder formed on the plunger 182, by its rear, reduced portion 184, and a flanged cap 196 secured to the rear end of the sleeve 171 as by a pin 198 received in a bayonet slot 200 in the rim of the sleeve.

*The washer feeding means*

Washer feeding means 6 (Figs. 1, 6, and 16 to 20) comprises a wheel 202 (Figs. 16 to 18) forming a positioning abutment for a plurality of radial, feeding pins or prongs 204 pressed in, but removable from, radial openings in an annular or ring flange 206 of a feed disk or drum 208 keyed or otherwise secured for rotation to wheel 202.

The wheel 202 is secured to and formed integrally with a stub shaft 210 which projects through the hub 212 of a disk or drum 208, the hub 212 serving as a bearing or journal for mounting the drum 208 and the wheel 202 in the vertical flange of a mounting block or bracket 214 secured in any convenient manner to the machine frame 14 above the revolving head 18 at work station 4 (see Fig. 11). The stub shaft 210 has secured to its outer end a ratchet wheel 216 and loosely supports a pawl operating lever 218. A lever pawl 220 (Figs. 19 and 20) is pivoted to the upper end of the lever 218 and is formed in its under surface with a pawl, tooth or dog 222 formed to engage the teeth of the ratchet and rotate the ratchet on swinging of the lever 218 in a counter-clockwise direction, as seen in Figs.

19 and 20, and to pass idly over the ratchet when the pawl lever is rotated in the opposite direction. A pawl control spring 224 is secured at one end to the lower end of the pawl lever 220 and at the other end to a pawl operating lever 218 at a point below the stub shaft 229 so as normally to urge the pawl 222 into engagement with the ratchet wheel 216. A bell crank 226, pivoted on the bracket 214, is formed with a locking or indexing pawl, tooth or dog 228 shaped to engage the teeth of the ratchet and prevent reverse rotation thereof while permitting a counter-clockwise rotation of the ratchet. The pawl 228 is urged to ratchet engaging position by a spring 230 secured at one end to the bell crank 226 and at the other end to a bracket 232 fastened to the forward wall of the bracket 214.

The feeding movement of the ratchet is controlled and adjusted by a feed control bar 234 slidably mounted in a slot or recess 236 in the side surface of the bracket 214. The bar 234 carries a pawl guiding and controlling pin 238 projecting laterally of the slide bar beneath the pawl 220. The pin 238 guides and supports the tail of the pawl 220 and, according to its position of vertical adjustment according to the size of the washer being fed, determines the degree of arcuate movement of the ratchet as the pawl is swung in a counterclockwise direction by the pawl lever 218.

The slide bar 234 also serves to control the connection and disconnection of the pawl and ratchet. For this purpose the bar is formed with an upwardly extending plunger portion 240 received in the bore 242 of a block 244 bolted to the top of bracket 214. The plunger portion 240 projects above the block 244 and is externally threaded to receive a threaded sleeve 246 to which is secured an operating knob 248. The raising of the knob 248 causes a lifting of pin 238 and the pin thereby raises the pawl or tooth 222 out of engagement with the ratchet 216. The pin 238 is held in raised position, and the pawl consequently out of engagement with the ratchet, by a latching lever 250 pivoted to the top of the block 244 as by a bolt 252, the lever being normally urged to latching position under the sleeve 246 by a spring 254 secured at one end to a pin 256 carried by the lever and at the other end to a pin 258 secured to a block 260 projecting above the bracket 214.

The pawl operating lever 218 is actuated by a plunger rod 262 slidably mounted in an opening in the upstanding arm or portion 180 of the spindle mounting frame 56. The rod carries at its forward end a block 264 provided with a recess or slot 266 receiving a pin 268 carried at the lower end of the pawl operating lever 218.

The washer strip 4 passes from the supply reel to the washer feeding means over a longitudinally curved guiding and supporting strip or strap 270 terminating just above the block 244, as seen in Fig. 16, the strap 270 being supported at its forward end in a washer strip guide 272, Fig. 7, bolted to an angle bracket 274 (see Fig. 1) mounted at its forward end on that portion of the frame which houses the revolving head 18. The supporting and guiding strap 270 is also supported intermediately by a generally H-shaped strip guiding channel 276, Figs. 1 and 8, resting on the upper end of a rod or tube 278 carried by the spindle operating bell crank 134, the rod 278 constituting the usual means for manually operating the bell crank 134. It will be evident that any convenient means may be employed to support the guide channel 276, the rod 278 being selected because of its convenient location in substantial alignment with the nut and washer assembly means.

The H-shaped guide channel 276 provides upstanding flanges to serve as guides restraining the washer strip against lateral movement. The washer strip guide 272 is preferably formed with a flange 280 extending above the longitudinal guide strap 270, as seen in Fig. 7, to serve as a lateral guide for the washer strip. It will be evident that guide 272 may be formed with a flange at its outer end complementary to the flange 280 to form a guiding wall for the other edge of the washer strip.

From the forward guide 272 washer strip 4 passes over the forward, downwardly curved end of the guide strip 270 and to the feed wheel 202 over a guide 282 formed by the forward surface of the plate 260. The guide 282 is in the form of a track or channel having side flanges, as shown in Fig. 18, spaced apart slightly greater than the width of the washer strip 4 so as laterally to confine the strip as it passes to the feed wheel. The washer openings of the strip receive the tapered ends of the radial feed pins of the feed wheel, which tapered ends project beyond the periphery of the annular flange 206 of the drum 208.

The guide surface or track 282 extends first tangentially of the feed wheel and then arcuately concentric to the feed wheel and then in a vertical downward direction tangential to the feed wheel or to the periphery of the annular flange 206 of the drum. The feed pins pass through the washer openings of the strip and are received in a central longitudinal slot 284, Figs. 16 and 18, in the guide surface of the plate 260. The plate 260 and a cover plate 286 are secured to the upstanding flange of the bracket 214 by a plurality of bolts 288, the plate 286 being substantially L-shaped in cross section, as seen in Fig. 18, to house the guide plate 260. Cover plate 286 is provided with a circular opening receiving the annular flange 206 of the drum 208 and the feed wheel 202 housed within the drum, this opening permitting ready assembly of the parts and inspection of the operation of the feed wheel.

*Washer severing mechanism*

The washer severing mechanism 8 (Figs. 1, 6, 9, 13, 14, 15, 21 to 23, and 26 to 29) comprises a pair of mounting blocks 290 and 292, of which the block 292 is preferably formed integrally with and at the forward end of the sleeve 178, the block 290 being secured by suitable positioning pins and bolts (not shown) to the block 292. The blocks 290 and 292 are provided with confronting, coaxial, semi-circular recesses forming a cylindrical housing chamber or bore 302 in which is mounted a washer severing roll 304 having external gear teeth 306 and a washer receiving slot 308 extending from the top to the bottom thereof substantially diametrically of the roll.

The washer severing roll 304 cooperates with a washer strip-holder and shear block 310 pinned and bolted to the blocks 290 and 292 and having a reduced lower portion received in the bore 302. The shear block 310 is formed with a washer strip receiving slot 312 passing from top to bottom thereof and adapted to be aligned with the washer slot 306 of the severing roll 304. Edges of the slot 312 at the top of the block are chipped or tapered as at 314 to form a generally frusto-conical guide surface for the washer strip as it passes into the severing means.

The blocks 290 and 292 are also formed with coaxial, aligned openings or bores 316 and 318 to receive and guide the plunger 172 of the assembly means 10. The mating surfaces of the blocks 290 and 292, below the bore 302, are formed with complementary recesses which form a washer receiving slot 320 to receive the severed washer from the receiving roller when the slot 308 in the roller is vertically aligned with the slot 320. Slot 320 serves as a guide for depositing the washer in the aligned bores 316 and 318 in advance of the plungers 172 and 188 when said plungers are retracted, as shown in Fig. 14.

The washer is of course slightly smaller than the bores 316 and 318 and therefore a washer feed control mechanism is provided to hold the washer in an upright vertical position to be picked up by the plungers 172 and 188 when those plungers are advanced from the position of Fig. 14 to the position of Fig. 13. This washer feed control mechanism, in the form shown in Figs. 13, 14, and 26 to 29, comprises a pair of rollers or pins 322 and 324 mounted in vertical slots 326 and 328 communicating on one side with the bore 316 and on the other side with transverse openings in which are mounted pins 330 and 332. The pins 330 and 332 are normally urged inwardly by spring strips 334 and 336 respectively bolted to the opposite sides of the block 292. The washer retaining pins or rollers 322 and 324 are normally urged by the springs 334 and 336 to the position shown in Figs. 26 and 28, in which position the rollers project into the opening 316 in advance of the plunger 172, the inward movement of the pins being limited by the inner sides of the slots 326 and 328 above and below opening 316. The severing roller is oscillated or rotated by an actuating rack 338 guided in aligned slots in the blocks 290 and 292 and the sleeve 178 and held in position by a cover plate 340 bolted to the sides of the blocks 290 and 292 and the sleeve 178. The rack is carried by a plunger 342 which may be formed integral with the rack and projects rearwardly thereform through a suitable bore in the sleeve 178 as shown in Fig. 15. A coil spring 344 interposed between the rearward end of the sleeve 178 and a pair of nuts 346 on the threaded end portions 347 of the plunger, urges the plunger and the rack rearwardly or to a retracted position, as shown in Fig. 14.

*Drive means for the washer feed mechanism, the washer severing mechanism and the assembly mechanism*

The drive means 12, Figs. 1, 6, 9, 13, 14 and 15, comprises a spindle which consists of a plunger 348 and a sleeve 350, the sleeve being secured to the plunger as by a pin 352 and the plunger being slotted at its rear end to receive the forward end of the adjustable link 140 to which it is pivoted as by pin 354. The plunger and sleeve are slidably mounted in the rear upstanding portion 356 of the frame 56 and are held against rotation by an abutment bar or key 358 received in longitudinal slots in the plunger 348 and sleeve 350 and adjustably secured to the frame portion 356 by a bolt 360 passing through an upstanding end portion 362 of the bar 358 and into a threaded hole in the frame portion 356. The sleeve 350 has secured to it a split side arm 364 clamped to the sleeve as by a bolt 366 and attached to the rod 262. The side arm is apertured as at 363 to permit ready passage of the abutment bar 358 as the plunger 348 and sleeve 350 are reciprocated between the positions shown in Figs. 13 and 14. The side arm is also provided with an aperture 370 through which the threaded end 348 of the rod 342 projects.

Reduced portion 184 of the plunger 182 projects into the forward end of the sleeve 350 and is secured to the sleeve as by a cross pin 372. The rearward movement of the rod 342 is adjustably determined by a set screw 374 threaded into the frame portion 356 and projecting forwardly therefrom to engage the end of the rod 342.

The abutment bar 358 adjustably determines the rearward limit of movement or position of the sleeve 170, as shown in Fig. 14.

*The nut tapping mechanism*

The nut tapping mechanism 54 (Figs. 1, 4, 9, 10, 30 and 31) comprises a sleeve 376 rotatably and slidably mounted in the upstanding portions 180 and 356 of the frame 56 and having secured to it intermediate its ends a drive gear 378 which, in every position of its longitudinal movement, meshes with a gear 380 secured to a continuously rotating shaft 382 also journaled in the upstanding portions 180 and 356 of the frame 56 and in the hollow journal bushing 384 of the revolving head 18. A second sleeve 386 is slidably mounted in the sleeve 376 and keyed thereto for rotation therewith. The second sleeve has threaded in its outer or forward end a chuck sleeve 388. The chuck sleeve 388 has a plurality of longitudinal slots therein forming resilient chuck jaws 390 which, by the resiliency of the slotted sections of the chuck sleeve, are normally urged outwardly to open position, as shown in Fig. 30. The chuck jaws are formed with frusto-conical peripheral surfaces 392 which engage the inner frusto-conical surface 393 at the forward end of the outer sleeve 376. A slide block 394 is mounted on the inner sleeve 386 by means of a ball bearing 396 fitted over that sleeve, beyond the rear end of the outer sleeve 376, and secured in position between an enlarged ring portion 398 of the inner sleeve and a bearing retainer ring 400 threaded on the sleeve 386. The sleeve 386 is provided with a plurality of, preferably three, longitudinal slots 402 in which are slidably mounted driving bars or keys 404 having reduced forward end portions 406 received in the rear end of the outer sleeve 376.

A sleeve 408 having at its forward end an enlarged head portion 410 is secured to the slightly reduced portion 412 of the inner sleeve 386 as by a set screw (not shown). The sleeve 408 carries a plurality of, preferably three, clutch levers 416 pivoted as by pins 418 in slots of the head 410 of the sleeve 408, the clutch levers 416 having longitudinal clutch pin portions 420 bearing at their forward end on the rear ends of the driving bars or keys 404 and having at their opposite ends beveled cam surfaces 422. The clutch collar 424 is slidably mounted on the barrel of the sleeve 408 and has at its forward end a frusto-conical camming surface 426 adapted to engage the beveled or cammed surfaces 422 of the clutch pins 420 so as to cause the clutch levers to swing inwardly from the position of Fig. 30 to the position of Fig. 31 when the forward movement of the inner sleeve has been arrested and thereby move the outer sleeve 376 forwardly of the inner sleeve. Sleeve 408 is provided with slots 428 complementary to the slots 402 in the sleeve 386 and aligned therewith to permit the inner and outer swinging movement of the clutch levers 416. Internally threaded collars or nuts 430 threaded on the reduced end portion 432 of the sleeve 386 retain the parts in assembled relation. A nut housing and feed tube 434 extends through the inner sleeve 386 and is secured thereto as by an externally threaded enlarged portion 436 mating with the internally threaded end portion 432 of the sleeve 386. Nut-like portion 438 on the outer end of the tube 434 provides ready means for removing the nut housing or feed tube from the inner sleeve.

The slide block 394 is held against rotation and guided by a stationary bar or key 440 bolted to the inner face of a mounting bar or block 442 secured as by bolts 444, Figs. 9 and 10, to the upstanding portions 180 and 356 of the frame 56.

The bar 440 also forms a guide for a slide 446, of U-shaped cross section having a lateral arm 448 received in an annular slot 450 in the clutch control ring or sleeve 424.

The slide block 394 moves between adjustable limit stops comprising bar 452 and 454 adjustably secured in any convenient manner to a bar or plate 456 bolted to the upper surface of the mounting bar 442 so that the stop bars are above the path of movement of the slide 446 but in the path of movement of the slide block 394.

The slide 446 is actuated by an adjustable link 458 pivoted at its forward end to lugs 460 depending from the slide and pivoted at the other end to the lever 126 (see Fig. 4). The lever 126 is actuated positively in opposite directions by the cam 110 which for that purpose is formed with an internal cam groove in which the cam follower roller at the lower end of the lever is received (Fig. 12A).

A threading tap 462 (Figs. 30, 31, 36) is formed at the forward end of a stationary nut feeding rod 464 which passes through the nut housing and feeding tube 434 and extends rearwardly beyond the end thereof, the rear end of the rod being curved and received in a stationary block 466, Figs. 9 and 10, bolted to the mounting bar 442. The block 466 is provided with a curved slot 468 of a size to receive nut and washer units to permit their ready passage along the slot from the forward end thereof to the rear end. A cover plate 470 is bolted to the surface of the plate 466 and extends over the curved slot 468. The interfitting of the end of the rod 464 in the curved slot 468 and the positioning of the cover plate over the slot prevent the nut feeding rod and the threading tap 462 from rotating with the chuck jaws 390 and the nut housing tube 434. The nut feeding rod 464 extends beyond the block 466 and terminates over a funnel 472 into which the assembled nut and washer units fall and are delivered to a suitable container.

A set screw 474 carried by the lateral arm 448 of the slide 446 is positioned to engage the block 394 thereby adjustably to determine the approaching movement of the collar 424 relative to the block 394.

*The driving mechanism of the automatic screw machine*

In order to understand the timed relation and sequence of operations performed upon the nut stock and the assembling of washers with the nut stock during the process of forming of the nuts, the drive mechanism 476 for the automatic screw machine and the additional mechanisms or attachments by which the machine is converted into a machine for manufacturing permanently assembled nut and washer units is diagrammatically illustrated in Figs. 12 to 12E.

This drive mechanism 476 comprises a drive motor 478 mounted in any suitable manner upon the machine frame as illustrated in Fig. 1. The motor 478 drives a countershaft 480 as by means of sprockets 482 and 484 and sprocket chain 486. Countershaft 480 through a gear reducing mechanism, represented by the intermeshing chain of gears 488, 490 and 492, drives the intermeshing gears 494 of the stock chucks 20. A gear 496 on the shaft 382 meshes with all of the like gears 494 and thereby assures continuous rotation of the shaft 382 in synchronism with the stock chucks 20. The shaft 382 continually rotates the nut tapping mechanism 54 through the gear 378 previously described.

The countershaft 480 also drives, through a gear reducing mechanism indicated by the gears 498 and 500, the driving member of a manually controlled clutch 502 of which the driven member is secured to a drive shaft 504 extending longitudinally of the machine at the rear side thereof. The shaft 504 through gears 506 and 508 drives a cross shaft 510 having a gear 511 and driving clutch member 512 secured thereto. The driving clutch member 512 cooperates with a driven clutch member including a gear 514 on a sleeve 516 (Fig. 12B) longitudinally slidable on the shaft 510. The gear 514 has at its forward end a clutch member 518 operated by a pin 520 (Figs. 12C to 12E) on a lever 521 carrying a cam roller at its lower end engaging the face of a cam segment 522 so that once each rotation of the cam segment 522 the sleeve is moved longitudinally of the shaft 510 and withdraws the driven clutch member 518 from engagement with the driving clutch member 512. The cam 522 is mounted on the rim of a gear 523 meshing with a gear 524 on a stud shaft (Fig. 12C). The gear 524 has a pinion portion 525 (Fig. 12) meshing with the gear 514. The clutch control lever 521 is latched in clutch disengaging position by a latch lever 528 released from a latch pin 529 on the lever 521 by a cam 530. The gear 523 is secured to and drives the crank shaft 526 which carries the indexing cam 44 by means of which the indexing lever 42, Fig. 1, is acuated. The shaft 526 also carries the crank 40 to which is pivoted the lever 38, Fig. 1, by which the grab mechanism for intermittently revolving the head 18 is actuated. Barrel cam 534 is secured to the forward end section of the shaft 526 and is engaged by cam rollers on the lower ends of the stock feed lever 24 and the chuck control lever 46 so as to operate the bar feed mechanism (not shown) in proper timed relation with the intermittent revolution of the stock head 18 to advance the stock toward the spindles at station No. 1.

A hand wheel 535 on the outer end of shaft 510 provides means for manually turning shaft 510 to set the tool spindles, as will hereinafter appear.

The gear 511 meshes with a gear 536 on a cross shaft 538 having at its right hand end a gear 540 of a chain speed gear mechanism 542, final gear 544 of which is secured to the end of a cross shaft 546 carrying worm gears 548 and 550 driving worm wheels 552 and 554. The worm wheels 552 and 554 are mounted on complementary longitudinal cam shafts 556 and 558 at the front and rear of the machine, these shafts carrying the cams 78, 80, 82 and 84 by means of which the side cutting tools 58, 60, 62 and 64 are moved in and out in timed relation to the intermittent revolution of the stock head 18. Cam shaft 558 also carries the latch control cam 530 which assures the re-connection of the crank shaft 526 to the shaft 510 on each complete rotation of the cam shaft 558 so that the proper timing relationship between the operation of the work tools and the intermittent advancement of the stock head and the stock is automatically maintained regardless of a change in speed or setting of the tools and tool spindles.

Cam shafts 556 and 558 carry at their rear ends gears 560 and 562 meshing with gears 564 and 566 on the opposite ends of the cross cam shaft 120 so that the cross cam shaft is driven from both ends thereby eliminating twist and stresses in the shaft, assuring exact synchronism between the side cutting tools and the various tool spindles. The cross shaft 120 carries the spindle actuating cams 110 to 118 inclusive, it being noted that the cam 110 as illustrated in Fig. 12A is formed with a segmental portion 110' forming an internal cam surface assuring, with the external cam surface portion 110'', of positive actuation of the nut tapping mechanism in both directions.

Operation of the machine

The five stock bars 22, which are preferably hexagonal in form, are continuously rotated by the continuous rotation of the stock chucks 20 driven from cross shaft 480, Fig. 12. At station No. 1, or as the revolving head carries a stock bar to station No. 1, the stock chuck associated with that stock bar is opened by the operation of the chuck control lever 46 as it is shifted by the barrel cam 534. In proper timed relation with the opening of that stock chuck, the bar feed mechanism is actuated by the stock feed lever 24 so as to advance the stock bar through the open chuck, the stock chuck being then closed and the rotation of the stock bar renewed. While the stock bar remains at station No. 1, the revolving head then being stationary, the side cutting tool head then being stationary, the side cutting tool 58 is advanced inwardly by the operation of the cam 78 to cut the end surface of the stock bar as shown in Fig. 32 to form a reduced, washer receiving portion or nut skirt 568 (Figs. 32 to 36 and 41). While the stock bar 22 remains stationary at station No. 1, the spindle 48 is advanced toward the stock under control of the spindle actuating cam 112 to cause the countersinking or center-punching tool kit 152 to penetrate the stock bar at the center thereof.

The revolving head 18 is now advanced one-fifth of a revolution by the operation of the crank 40 and the indexing cam 44 to position the stock bar at station No. 2. At this station the side cutting tool 60 is moved inwardly to the stock bar and the side cutting tool cuts an annular groove 570 in the stock bar a predetermined distance from the front end of the stock bar. The forward wall of this annular groove 570 partially forms the head surface of the nut blank. At station No. 2, the spindle 50 is advanced longitudinally toward the stock bar so that the drill bit 154 drills the central hole 574 in the nut blank, the drill being so positioned when the spindle has advanced to its fullest extent that the hole in the nut extends at least to the plane of the partially formed head surface of the nut. At the same time that the drill bit approaches its point of maximum penetration of the nut stock, the surfacing tool bit 156 engages the end or free surface of the nut skirt portion 568 and surfaces that skirt to a precisely required axial length or depth.

After the spindle 50 is retracted thereby withdrawing drill bit 154 and the surfacing tool bit 156 from the bar stock, the head 18 revolves to position the stock at station No. 3. At this station the side cutting tool 62 is advanced to the nut stock and chamfers the external corners of the head of the partially formed nut blank as at 572, Fig. 34.

At this station, as the spindle 52 advances to the nut stock the boring tool or bit 164 moves axially of the hole 574 in the nut until the spindle has advanced to its fullest extent. The inward movement of the side cutting tool 62 is so timed in relation to the advancing movement of the spindle 52 that as the side cutting tool moves inwardly the bar 170 carried by the side cutting tool slide engages the set screw 172 carried by the lever 160 and moves the boring tool off center with respect to the nut stock so that the boring tool engages the wall of the nut opening in the plane of the partially formed head surface of the nut and chamfers or countersinks the edge of the nut hole in the plane of the head surface of the nut.

The side cutting tool 62 moves outwardly prior to the retraction of the spindle 52 so that the boring tool is recentralized with respect to the nut opening 574 before the spindle 52 begins to move rearwardly, hence the spring 166 returns the boring tool to a central position before the spindle starts to retract.

When the spindle 52 has been retracted sufficiently for the boring tool to clear the nut stock, the revolving head 18 is again rotated to position the stock bar at station No. 4 at which a washer is assembled with the partially formed nut blank. The stock having been positioned at this assembly station, the forward movement of the plunger 348 and sleeve 350 cause first a forward movement or advance of the plunger 188, the slightly tapered end portion 192 thereof passing through the hole in the washer and the washer resting with its inner margin in contact with the more sharply tapered or frusto-conical section 190 of the plunger 188. As will be evident from Figs. 35 and 41, the inner margin 7' of the washer 7 is frusto-conical or tapered with its largest diameter facing the plunger 188. The inner margin is, however, of slightly greater diameter than the forward end of the sharper tapered frusto-conical portion 190 of the plunger 188 so that the washer floats on this portion of the plunger while engaged at its external margin by the hollow plunger 173. The limited movement of the central plunger 188 relative to the hollow plunger 173 is such that the plunger 188 cannot advance relative to the plunger 173 sufficiently for the frusto-conical sharply tapered portion 190 of the plunger to engage the entire inner periphery of the washer for in that event the washer would be fully seated on the section 190 of the plunger 188 and could not pass over the skirt 568 of the partially formed nut blank. As the two plungers advance toward the nut blank, with the washer floating on the tapered end of the inner or solid plunger and backed up along its external periphery by the hollow plunger, the washer is forced between the washer positioning pins 322 and 324 and cams the pins outwardly against the urging of the springs 334 and 336, Figs. 26 to 29. As the washer approaches the skirt 568 of the nut blank it appears to "jump" onto the skirt for the internal diameter of the skirt (see Fig. 35) is substantially equal to the small diameter of the frusto-conical portion 190 of the plunger on which the washer floats and its external diameter is slightly less than the internal diameter of the washer. The skirt portion 568 of the partially formed nut blank is sufficiently greater in depth than the maximum thickness of the washer, i. e., the thickness of the teeth 7" of the washer, that the washer is fully received on the skirt before the plungers 188 and 173 have completed their forward movement. Hence, when the frusto-conical, sharply tapered portion 190 of the plunger 188 engages the inner surface of the skirt at the forward end thereof it enlarges, upsets or swages it outwardly to form a frusto-conical external rib 9", Fig. 41, overlying the frusto-conical or countersunk inner margin 7' of the washer 7 thereby limiting the axial movement of the washer relative to the nut and permitting substantially free rotation of the washer on the skirt of the nut.

As the plungers 173 and 188 move forwardly to telescope the washer with the partially formed nut blank, the side arm 364, Figs. 13, 14 and 15, moves forwardly with the sleeve 350 to which it is clamped and moves forwardly or advances the actuating rod 262 which, as shown in Figs. 19 and 20, swings the pawl operating lever 216 of the washer strip feeding mechanism 6 to advance the strip through the shear block 310 (Figs. 13, 14, 26 and 27) a distance of one washer. At the time the washer strip is advanced the severing roll 304 is in the position shown in Figs. 14 and 21, in which position the axial extending diametrical slot 308 in the roller is aligned with the slot in the shear block 310. Hence, as the strip advances the foremost or end washer of the strip 4 passes into the severing roll.

Thereafter, as the side arm 364 continues to advance it contacts the pair of nuts 346 on the rod 342 and advances the rack 338 to the left, as seen in Figs. 13 to 15 and 21 to 23. The advancing of the rack causes rotation of the severing roll in a counter-clockwise direction, as indicated in Fig. 21, from the position of that figure to the position of Fig. 22, in which latter position the washer received in the slot 308 has been rotated or turned a sufficient angular distance to break or sever the end washer, from the next adjacent or second washer confined in the slot of the shear block 310, by breaking the connection between adjoined diametric teeth 7" of the adjacent washers 7, as illustrated in Figs. 24 and 25. The direction in which the foremost washer is turned with respect to the direction of twist of the adjoined teeth is important. Thus the foremost washer must be turned in a direction counter to the direction of twist of the adjoined teeth. Turning of the washer in the direction of twist of the adjoined teeth will first cause the metal of the twisted, connected tooth of the foremost or end washer to straighten out and lie in the same plane as the twisted, connected tooth of the second washer and therefore a large, additional turning of the washer will be required to effect a severance of the washers. Turning of the washer in a direction counter to the direction of the twist of the adjoined teeth will, however, quickly cause the breaking or severing of the metal joining the connected teeth between the twisted edges thereof. It should be understood that in forming the strip the twisting of the teeth of the washers causes a partial severance of the connection between adjoined diametrical teeth. It will therefore be seen that the washer strip 4 is so wound and so fed to the severing roll that its twisted teeth will be presented to the severing roll in a position twisted clockwise with respect to the direction of rotation of the severing roll. Hence a counter-clockwise rotation of the severing roll causes breaking or severing of the adjoined washers by a minimum degree of angular rotation.

The extent of movement of the washer strip 4 is precisely adjusted by adjustment of the pawl controlling pin 238 of the strip feeding mechanism 6 as to position the line of joinder between the adjoined diametrical teeth of the first and second washers in the plane of the lower edge of the shear block 310, a sillustrated in Fig. 26.

The foremost or leading washer of the strip having been severed or broken from the next adjacent or second washer of the strip, and the previously severed washer having been assembled or telescoped with the partially formed nut blank, as hereinbefore described, by the forward or advance movement of the plungers 349 and 350, these plungers are now retracted by their actuating cam 118. As these plungers are retracted, the plungers 188 and 173 are also retracted, the plunger 173 moving rearwardly with the plunger 188 until the cap 196 is engaged by the abutment, bar or key 358, after which the plunger 188 continues to move rearwardly and to be further retracted to the position shown in Fig. 14 within the hollow plunger 173.

As the sleeve 350 is retracted, the spring 344 forces the actuating rod to move rearwardly with the sleeve until the headed end of the rack actuating rod 342 is engaged by the stop screw 374. This retraction of the rack actuating rod causes movement of the rack 338 to the right in Fig. 15 and a consequent turning of the severing roll 308 in a clockwise direction, as seen in Figs. 22 and 23, from the position of Fig. 22 to the position of Fig. 23, in which latter position the washer receiving slot 308 in the severing roll, and the severed washer in said slot is aligned with the passage 320 between the chamber 302 and the axially aligned openings 316 and 318 in the blocks 290 and 292. Hence, when the severing roll has reached the position of Fig. 23, which is the same as the position shown in Fig. 14, the severed washer falls into position in advance of the forward end of the hollow sleeve 173 when that sleeve has been retracted to its fullest extent, as shown in Fig. 14.

The washer strip actuating rod 262 is retracted with the sleeve 350 and causes the lever operating pawl 218 to move in a clockwise direction, as seen in Figs. 19 and 20, and the pawl lever 220 moves freely over the ratchet wheel 216.

From the assembly station the intermittently operated head 18 carries a partially formed nut blank permanently assembled with the washer to the final station, i. e., station No. 5. At this station the nut stock is aligned axially with the threading tap 462. While the head 18 remains stationary, the cam 110 operates the lever 126 in a direction to advance the link 458 (Figs. 10 and 31) and thereby moves the clutch collar 424 forwardly, from the rear position shown in Fig. 30. As the collar 424 moves forwardly, the drive bars or keys 404 are moved forwardly by the clutch levers 416. The drive bars 404 bear against the rear end of the clutch jaw control sleeve 376 and force the latter forwardly. The clutch jaw control sleeve carries with it the chuck sleeve 388, the sleeve 386 and the nut feeding tube 434 until the slide block 394 engages the forward stop 452 and the forward movement of the sleeve 386, the chuck sleeve 388 and the nut housing tube 434 is thereby arrested. The drive bars 404 are free, however, to move forwardly relative to the sleeve 386 by reason of the longitudinal slot 402.

The stop 452 is so adjusted and positioned that the forward movement of the chuck jaws is arrested when they are positioned to encompass the partially formed nut blank on the forward end of the stock bar at station 5. Hence the continued forward movement of the chuck jaw control sleeve 376 to the position shown in Fig. 31 causes the chuck jaws to close upon and grasp the nut blank. It should be noted at this point that the sleeve 376, the sleeve 386, the nut housing tube 434 and the chuck jaws are constantly rotated by the gear 378 at the same speed as the speed of rotation of the stock bars.

As the chuck jaws 390 close upon the partially formed nut blank at the forward end of the stock bar, and just after the nut has been grabbed by the chuck jaws, the side cutting tool 64 (Fig. 11) moves inwardly to sever the small connecting neck or piece between the nut blank and the rest of the stock bar, as shown in Fig. 36.

The nut blank having then been severed, the cam 110 moves the control collar 424 rearwardly. The resilience of the jaws of the chuck tends to force the jaw control sleeve 376 rearwardly relative to the chuck sleeve but the control collar 424 being positioned over the clutch pin portions 420 prevents outward movement of the clutch levers 416 and hence causes the control sleeve 376, chuck sleeve 386 and the housing 434 to move rearwardly with the clutch control collar until the slide block 394 engages the rear stop 454. During this rearward movement of the sleeves the nut blank, with a washer already assembled therewith, is carried onto and past the threading tap 462 while the nut is being rotated by the rotation of the chuck sleeve. The chuck jaws remain closed upon the nut until it is carried beyond the rear end of the threading tap 462 and then, when the slide block 394 subsequently engages the rear stop 454, the rearward movement of the chuck sleeve and the nut housing tube is arrested. The rearward movement of the clutch control collar 424 is not, however, arrested. Hence, the collar moves with respect to the clutch sleeve 408 and the clutch levers 416 are freed for outward movement, thereby permitting the resilience of the chuck jaws to force the jaw control sleeve 376 rearwardly relative to the chuck sleeve until they occupy the relative position shown in Fig. 30. The completely formed nut and washer assembly unit is deposited, on opening of the chuck jaws, upon the nut feeding rod 464 and moved therealong by engagement with the next assembled unit as it is carried past the rear end of the threading tap 462 by the next succeeding rearward movement of the chuck jaws. Hence the retracting movement of the chuck jaws is utilized to effect feeding of the assembled units along the nut feeding tube and through the nut feeding or housing tube 434. Finally, the assembled unit drops from the rear end of the rod 464 into the discharge funnel 472.

It will be seen from the foregoing description of the operation of the machine that the present invention presents a novel method of manufacturing permanently assembled nut and washer units by forming a reduced section at the forward end of each on a stock bar to provide a nut skirt or washer receiving section; center tapping the nut stock; forming an annular groove in the stock bar displaced from the forward end thereof the desired nut thickness; drilling a hole in the nut stock through the reduced section and into the plane of the annular groove in the stock bar to provide the center hole in the nut; surfacing the face of the reduced section of the stock at the forward end thereof to a depth slightly greater than the thickness of the washer to be assembled with the nut; chamfering the stock bar at the forward wall of the annular groove to provide the necessary chamfered head corners for the nut while simultaneously, internally boring the stock adjacent the inner end of the nut opening substantially in the plane of the forward wall of the annular groove of the nut stock to provide an internal, chamfered edge in the head of the partially formed nut blank; feeding a strip of washers to an assembly station to which the partially formed skirted, drilled and chamfered nut blank is then carried; detaching, breaking, or shearing the foremost washer from the strip; telescoping the washer with the skirt of the partially formed, drilled and chamfered nut blank and in the same operation, or at the same time, swaging, extruding and enlarging the skirt of the nut to hold the washer against axial displacement from the skirt of the nut while leaving the washer free to rotate relative to the nut; severing the nut stock in the plane of the forward wall of the annular groove to completely sever the nut blank from the nut stock and thereafter threading the hole in the nut blank of each assembled, individual unit.

*First modified washer feed control mechanism*

The modified washer feed control mechanism shown in Figs. 42 and 43 comprises a tapered sleeve 574 consisting of three coaxial sections or segments 576, 578 and 580 mounted in an aperture 582 in the block 290 in axial alignment with the sleeve 172 and the plunger 188. The tapered sleeve 574 is mounted in the opening 582 with its end of largest internal diameter facing the sleeve 173 and the slot 320 which forms the feed passage for the washers from the chamber 362 of the washer severing mechanism to the opening 318, through which the sleeve 173 moves. A coil spring 584 encompasses the three segments or sections of the tapered sleeve 574 and a split, spring ring 586 also encircles the sections of the tapered sleeve at its outer end, the split, spring ring 586 being in the form of a wire received in an annular groove formed in the enlarged end portions or annular flange portions 588 at the forward end of the sections of the tapered sleeve. The sleeve is held in position in the block 290 by radial protuberances 590 at the rear end of the sleeve, which protuberances are received in complementary slots in the block 290 that extend outwardly from the opening 582. The rear end of the tapered sleeve is provided with a chamfered or countersunk surface 592 acting as a pilot for the washer, and a cam surface for expanding the sleeve, as it is moved into the tapered sleeve by the sleeve 173 and the plunger 188. The tapered, inner wall surface of the sleeve 574 prevents the washer as it is moved therethrough from tilting with respect to the plunger 188 and sleeve 173. The sections of the tapered sleeve are permitted to move outwardly against the urging of the spring 584 and the retaining spring ring 586 so that the tapered sleeve acts frictionally to retain the washer in position perpendicular to the axis of the plunger 188 of the sleeve 173 as the washer is fed by the plunger sleeve to the nut stock.

*Second modified form of the washer feed control mechanism*

The second modified form of washer feed control mechanism, shown in Figs. 44 to 47, comprises a pair of slide blocks 594 and 596 slidably mounted in slots in the block 290 extending transverse to the opening 316, the slide blocks being urged into abutting engagement by leaf springs or straps 598 and 600 bolted to the cover plate 340 and the block 292. Outward, separating movement of the slide blocks is limited by the engagement of stop pins 602 and 604 with the outer walls of slot 605 and 606 in which the pins are received. The slide blocks are formed at their abutting edges with confronting part circular recesses 608, each of which is slightly less than 180 degrees in arcuate extent but of the same diameter as the external diameter of the washer so that the opening formed thereby when the blocks are in abutting relation as shown in Fig. 45, is slightly oval rather than truly circular and of a cross dimension which is slightly less than the external diameter of the washer. The surface of the slide blocks facing the sleeve 173 is beveled or countersunk as at 610, Fig. 46, so as to act as a pilot surface centralizing the washers and as a camming surface forcing the slide blocks apart as the washer is advanced therethrough by the forward movement of the sleeve 172 and the plunger 188.

It will be seen from the foregoing description that applicant has provided a method and a machine for manufacturing assembled nut and washer units; a method and machine for assembling washers with nut blanks during the process of manufacture of the nuts; a method and means for assembling continuous ring, preferably toothed, lock washers with nuts or nut blanks in such manner that the washers may be rotated freely relative to the nuts, and yet be held positively against dislodgement therefrom; attachments for a nut making machine, by means of which said machine is converted into a machine for making nut and washer assembly units; means for assembling washers with tapped but unthreaded nut blanks; means for feeding a strip of washers to washer severing and assembling mechanisms by means of which the washers are assembled with nut blanks in the process of manufacturing nuts; an assembly mechanism which not only telescopes a nut or nut blank with the washer, but at the same time causes interlocking of the washer with the nut so that permanently assembled units of nuts and washers are provided by this assembly mechanism, an attachment or attachments for a standard or well known automatic screw machine, whereby said machine can be readily converted into a machine for manufacturing assembled nut and washer units; and a machine for automatically feeding partially formed skirted nut blanks to an assembly mechanism while said blanks are still attached to the nut stock, the assembly mechanism telescoping washers with the skirts of the nut blanks and upsetting, swaging or enlarging the skirts of the nut blanks beneath the washers, or in the plane of the washers, permanently to hold the nuts and washers in assembled relation, and thereafter automatically threading or tapping the nut blanks and severing the same from the stock.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A method of manufacturing a permanently assembled nut and washer unit comprising forming at one end of a bar of nut stock a washer receiving section, thereafter grooving the stock inwardly from said end a distance corresponding to the desired nut height, thereafter forming in the nut stock an opening extending inwardly from said end into the plane of the groove in the stock, thereafter telescoping the washer with said washer receiving section of the nut stock, thereafter enlarging a portion of the nut stock on the free side of the washer to hold the washer thereon, thereafter severing the stock between the groove and the nut opening, and thereafter threading the nut blank.

2. A method of manufacturing permanently assembled nut and washer units comprising forming at one end of a stock bar a hollow nut blank having at one side a washer receiving section and at the other side a portion of limited cross section connecting the partially formed nut blank to the stock bar, thereafter telescoping a washer with the washer receiving section of the partially formed nut blank, severing the connecting portion, and thereafter threading the nut blank.

3. A method of manufacturing permanently assembled nut and washer units comprising forming a washer receiving section of reduced diameter at one end of a solid stock bar, thereafter cutting a groove in the bar stock displaced from said end of the stock a distance corresponding to the nut height, thereafter drilling the bar stock from said end into the plane of said groove, thereafter surfacing the washer receiving section to the required axial length slightly greater than the thickness of the washer to be assembled therewith, thereafter telescoping a washer with the washer receiving section of the stock bar, thereafter enlarging a portion of the stock on the free side of the washer to hold the washer thereon, thereafter cutting the material of the stock bar between the groove and the drilled hole, and thereafter threading said hole.

4. A method of manufacturing permanently assembled nut and washer units comprising center tapping bar stock at one end, thereafter forming a washer receiving section at said end concentric to the center tap, thereafter grooving the bar stock inwardly from said end to form a nut body joined to the stock by a portion of restricted cross section, thereafter drilling from the center tap end of the stock bar into the plane of the connecting portion, thereafter chamfering the external edge of the stock at the forward wall of the groove, thereafter cutting an annular chamfering groove in communication with the drilled hole in the stock in the plane of the forward wall of the groove, thereafter telescoping the washer with the washer receiving section of the stock, thereafter swaging the section permanently to hold the washer on the stock, thereafter severing the connecting portion of the stock in the plane of the forward wall of the groove to form an individual nut blank permanently assembled with the washer, and thereafter threading the nut blank.

5. A method of manufacturing permanently assembled nut and washer units comprising successively forming at the forward end of a stock bar a nut blank joined to the stock by a connecting portion of restricted cross section and having a nut opening extending inwardly from the forward end of the stock bar from the plane of said connecting portion and having a washer receiving section at the forward end of the stock bar, then successively detaching the foremost washer from a strip of washers, then telescoping each washer after detachment from the strip with the washer receiving section at the forward end of the stock bar, then swaging the material of the washer receiving section of the stock bar permanently to hold the washer against axial displacement, then severing the portion connecting the partially formed nut blank to the stock bar, and individually threading the nut blanks of the assembled units after severance of said connecting portion.

6. In a machine for manufacturing permanently assembled nut and washer units, means for forming a hollow nut blank having a washer receiving section of reduced diameter at the forward end of a bar of nut stock, means telescoping the washer with the washer receiving section of the stock bar, means operatively associated with said telescoping means for enlarging the nut stock on the free side of the washer into overlapping relation with the inner margin of the washer permanently to hold the washer in assembled relation therewith, and means operative in timed relation with said telescoping and said enlarging means for thereafter severing from the forward end of the stock a nut blank having the washer thereon, and means for threading said nut blank.

7. In a machine for manufacturing permanently assembled nut and washer units from a bar of nut stock comprising means for successively positioning the bar stock at a plurality of work stations, means at preliminary work stations for forming at the forward end of the stock bar a washer receiving section and a nut opening in the stock bar extending inwardly from said end of the bar, means at subsequent work stations for first telescoping a washer with said washer receiving section of the stock bar and thereafter severing the stock bar transversely at a distance from the forward end thereof corresponding to the desired axial dimension of the nut.

8. In a machine for manufacturing permanently assembled nut and washer units, means for feeding a bar of nut stock to a plurality of work stations successively, means at one of said work stations for forming at the forward end of the stock bar a washer receiving section of reduced diameter, means at a subsequent one of said stations for telescoping a washer with the washer receiving section of the stock bar, means at another of said stations for severing from the forward end of the stock bar a nut blank having said washer telescoped therewith, means for threading the nut blank, means for carrying the severed nut blank with the washer assembled therewith from the stock bar to the threading means, and means for operating said section forming means, said telescoping means, said severing means, and said nut blank carrying means in proper timed relation.

9. In a machine for manufacturing nut and washer units, means for feeding nut elements each having a washer receiving section of reduced diameter projecting therefrom to an assembly station, means for feeding a strip of washers to a predetermined location, means at said location for successively detaching washers from the strip and positioning the washers in succession at said assembly station, means at said assembly station for successively telescoping the washers with the washer receiving sections of the nut elements, means for enlarging a portion of each nut element after telescoping the washer therewith to hold the washer thereon, and means for operating said nut feeding means, said washer strip feeding means, said severing means, said telescoping means, and said enlarging means in proper timed relation.

10. In an automatic screw machine having means for feeding a plurality of bars of nut stock to a plurality of work stations successively and work tools at said stations for successively cutting and forming the stock bars to form nut blanks, the combination of means for feeding washers successively to an intermediate work station, and means at said station operatively interconnected with the stock feeding means for telescoping a washer with a partially formed nut blank at the forward end of the stock as said stock is presented to said station.

11. In an automatic screw machine having means for feeding a bar of nut stock to a plurality of work stations successively, and means at said stations for forming a nut blank from said bar stock, the combination of means for feeding a washer successively to an intermediate work station, means at said station for telescoping a washer fed thereto with a partially formed nut blank at the forward end of the stock bar when the stock bar is presented to said station, and means connected to the stock bar feeding means and the telescoping means for actuating the telescoping means in proper timed relation with the stock bar feeding means.

12. In a multi-spindle automatic screw machine having means for feeding a bar of nut stock to a plurality of work spindles, means operatively connected to one of the spindles for telescoping a washer with the forward end of the bar stock, means operatively connected with spindles in advance of said one spindle for forming at the forward end of the stock bar an apertured nut element having a forwardly projecting washer receiving section, and means operatively connected with a work spindle for enlarging the material of the nut element after telescoping of the washer therewith.

13. In a machine for manufacturing permanently assembled nut and washer elements, means for feeding skirted nut elements to an assembly station, means forming a washer receiving chamber axially aligned with the nut element at the said assembly station, and means for feeding washers successively into said chamber, reciprocably mounted plunger means movable through said chamber and having a tapered end portion adapted to project through the hole in the washer to centralize the washer with respect to the skirt of the nut element, said plunger further having a portion for radially swaging said skirt to trap a washer thereon, and means for actuating said nut element feeding means, said washer feeding means and said plunger means in timed relation.

14. In a machine for manufacturing permanently assembled nut and washer elements, means for successively feeding skirted nut elements, a sleeve mounted for axial reciprocation, a plunger mounted in said sleeve for rectilinear movement relative thereto to project into the hole of a washer positioned in the path of said sleeve and for movement with said sleeve to deliver a washer to the skirt of a nut element positioned by said feeding means in the path of said sleeve, means for feeding washers successively into the path of said sleeve, and actuating means interconnecting said nut element feeding means, said washer feeding means, said sleeve and said plunger for actuation in proper timed relation.

15. In a machine for manufacturing permanently assembled nut and washer elements, means for feeding nut elements each having a washer receiving section to an assembly station, means at said assembly station for receiving washers fed thereto and telescoping same with said nut blanks, means for feeding a strip of washers to a washer severing station, means at said station for successively severing the washers from the strip and positioning the severed washers successively at the assembly station, and means for operating said feeding means, said washer severing means, and said receiving and telescoping means in proper timed relation.

16. In a machine as set forth in claim 15 where said severing means comprises a stationary member having a washer receiving slot, a shiftably mounted member having a washer receiving slot therein adapted in one position of the shiftably mounted member to be aligned with the slot in said stationary member to receive a washer therefrom and adapted to be shifted to a second position with respect to the stationary member to sever the washer from the strip, and means operatively interconnecting said shiftable member and the strip feeding means for shifting said shiftable member in timed relation with the feeding of the strip.

17. In a washer feeding mechanism comprising means for feeding a strip of washers longitudinally, a stationary slotted member through which the strip is fed by said feeding mechanism, a shiftable member abutting said stationary member and having a slot therein adapted to register with the slot in the stationary member in one position to receive the foremost washer from the strip on feeding of the strip through such stationary member by said feeding means, and means for shifting said shiftable member in timed relation with said feeding means from said one position to a second position to sever the foremost washer of the strip from the next succeeding washer of the strip.

18. Washer feeding means comprising a stationary shear block having a slot therethrough, means for feeding a strip of washers through the slot in said shear block, an oscillatably mounted member having a diametrical slot therein adapted in one position to align with the slot in the stationary shear block and in another position to be angularly displaced from the slot in the shear block whereby to sever the foremost washer of the strip from the succeeding washer in the stationary shear block and means for delivering the severed washer from the oscillatable member to a point of use.

19. A nut element and washer assembly mechanism comprising means for feeding skirted nut elements successively to an assembly location, means for holding a washer in axial alignment with a nut element at said location, means for feeding washers successively to said holding means, plunger means mounted for reciprocation relative to said holding means and axially of aligned nut elements and washers, said plunger means having a reduced end portion for centralizing nut elements and washers and having an enlarged portion for radially swaging a nut element skirt to trap a washer thereon, and means for actuating said nut element feeding means, said washer feeding means, and said plunger means in timed relation.

20. A nut element and washer assembly mechanism as set forth in claim 19 wherein the plunger means comprises a central plunger for centralizing the nut elements and washers and swaging the nut element skirts, and a washer engaging element lying externally of said plunger and coaxial therewith for supporting a washer in contact with a nut element, said plunger and said washer engaging element being axially movable relative to one another.

21. A nut element and washer assembly mechanism as set forth in claim 20 wherein the central plunger has a reduced end portion for centralizing the nut elements and washers, and a frustoconical portion immediately adjacent said reduced end portion for outwardly swaging nut element skirts to trap washers thereon.

22. A nut element and washer assembly mechanism as set forth in claim 19 wherein said washer holding means includes washer engaging holding portions yieldable transversely of said washer to release said washer upon actuation of said plunger means.

23. In a machine for manufacturing permanently assembled nut elements and washers, means for successively feeding to an assembly station nut elements each having a washer receiving section having a radially deflectable wall portion, means for successively feeding washers to said assembly station, means at said station for telescoping the nut elements and washers fed to said station by said washer feeding means and said nut element feeding means, means for radially deflecting the radially deflectable wall portion of the washer receiving section of each nut element after telescoping of a washer therewith permanently to hold the washer in assembled relation with the nut element, and means for automatically operating said nut element feeding means, said washer feeding means, said telescoping means, and said deflecting means in proper timed relation.

24. In a machine for manufacturing permanently assembled nut and washer elements, means for feeding to an assembly station a succession of nut elements each having a work clamping face and a washer element receiving section inwardly of said clamping surface, means for feeding to said assembly station a succession of washer elements each having a portion to interfit with said washer element receiving section of one of said nut elements, means at said assembly station for telescoping said portion of each washer element with the washer element receiving section of one of said nut elements fed to said station by said nut element feeding means, means for upsetting radially of the nut element a portion of the washer element receiving section of said nut element into overlapping relation with said portion of the assembled washer element permanently to hold the washer element in assembled relation therewith, and means for automatically operating said nut feeding means, said washer element feeding means, said telescoping means, and said upsetting means in proper timed relation.

25. In a machine for manufacturing permanently assembled nut and washer elements, means for successively forwarding to an assembly station nut elements each having a washer element receiving section, means for successively feeding to said assembly station washer elements having sections cooperable with the washer element receiving sections of said nut elements, means at said station for axially aligning the nut elements and washer elements fed to said station by said washer element feeding means and said nut element feeding means, means for applying an axial force to each aligned nut element and washer element to deform one of said sections of each pair of aligned nut elements and washer elements into permanently telescoped relation, and means for operating said nut element feeding means, said washer element feeding means, said aligning means and said axial force applying means in timed relation.

26. In a machine for manufacturing permanently assembled nut and washer elements, means for successively feeding to an assembly station nut elements each having a washer receiving section, means for feeding washer elements in strip form to said assembly station, means for successively severing washer elements from said strip, each washer element having a section cooperable with said washer receiving section, means at said station for axially aligning the nut elements and washer elements, means for applying axial force to each aligned nut element and washer element to deform one of said sections of each pair of aligned elements to maintain the pairs of aligned nut and washer elements in permanently telescoped relation, and means for operating said nut element feeding means, said washer element feeding means, said aligning means, and said axial force applying means in timed relation.

27. In a machine for manufacturing permanently assembled nut and washer elements, means for successively feeding skirted nut elements, washer carrying means mounted for axial reciprocation, a plunger mounted in said washer carrying means for rectilinear movement relative thereto and for movement with said washer carrying means to carry a washer against a nut element positioned by said feeding means coaxial with said washer carrying means and for swaging the skirt of said nut element, means for feeding washers successively into coaxial relation with said washer carrying means and a nut element, and actuating means connecting said nut element feeding means, said washer feeding means, said washer carrying means, and said plunger for actuation in proper timed relation.

28. In a washer feeding mechanism comprising means for feeding a strip of washers longitudinally, stationary means through which said strip is fed by said feeding mechanism for preventing said strip from twisting, a rotatable member mounted adjacent said stationary member and having its axis of rotation substantially along the path of said strip, said rotatable member having means for twisting each successive washer relative to the remainder of said strip, and means for rotating said rotatable member in timed relation with said feeding means to twist each succeeding washer relative to the remainder of the strip to sever the washers from the strip.

29. In a machine for manufacturing nut element and washer units, means for feeding nut elements each having a washer receiving section of reduced diameter projecting therefrom to an assembly location, means for feeding a strip of washers to said assembly location, means at said assembly location for successively telescoping the washers with the washer receiving sections of the nut elements, means at said assembly location for enlarging the section of reduced diameter of each nut element after telescoping a washer therewith to hold the washer thereon, means at said assembly location for successively detaching washers from the strip prior to the aforesaid telescopic assembly of said nut and washer elements, and means for operating said nut element feeding means, said washer strip feeding means, said telescoping means, said enlarging means, and said detaching means in predetermined timed relation.

MORITZ H. NIELSEN.

References Cited in the file of this patent

UNITED STATES PATENTS

| Number | Name | Date |
|---|---|---|
| 990,581 | Neider | Apr. 25, 1911 |
| 1,156,798 | Meaker | Oct. 12, 1915 |
| 1,381,437 | Smith | June 14, 1921 |
| 1,431,493 | Thomas | Oct. 10, 1922 |
| 1,883,068 | Stoll | Oct. 18, 1932 |
| 2,182,939 | Brinkham | Dec. 12, 1939 |
| 2,257,479 | Olson | Sept. 30, 1941 |
| 2,303,224 | Olson | Nov. 24, 1942 |
| 2,352,118 | Poupitch | June 20, 1944 |
| 2,374,241 | Simmonds | Apr. 24, 1945 |